(12) United States Patent
Palekar et al.

(10) Patent No.: US 9,805,049 B1
(45) Date of Patent: Oct. 31, 2017

(54) MIGRATING APPLICATIONS OVER ASYNCHRONOUS DISTANCES USING SEMI-SYNCHRONOUS ACCELERATION

(71) Applicants: Ashish A. Palekar, Franklin, MA (US); Bradford B. Glade, Harvard, MA (US); Anshul Chadda, Framingham, MA (US); David L. Black, Acton, MA (US); Roel van der Goot, Edmonton (CA); Victor Salamon, Edmonton (CA)

(72) Inventors: Ashish A. Palekar, Franklin, MA (US); Bradford B. Glade, Harvard, MA (US); Anshul Chadda, Framingham, MA (US); David L. Black, Acton, MA (US); Roel van der Goot, Edmonton (CA); Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/768,679

(22) Filed: Feb. 15, 2013

(51) Int. Cl.
*G06F 17/30* (2006.01)
*G06F 9/48* (2006.01)
*G06F 9/455* (2006.01)

(52) U.S. Cl.
CPC ........ *G06F 17/30174* (2013.01); *G06F 9/455* (2013.01); *G06F 9/4856* (2013.01)

(58) Field of Classification Search
CPC ...... G06F 9/455; G06F 9/5088; G06F 9/4856; G06F 9/45558; G06F 9/45533; G06F 17/30174
USPC ........................................................ 707/634
See application file for complete search history.

(56) References Cited

U.S. PATENT DOCUMENTS

| | | | |
|---|---|---|---|
| 7,054,883 B2 | 5/2006 | Meiri et al. | |
| 7,228,396 B2* | 6/2007 | Yoder et al. | 711/162 |
| 7,266,706 B2 | 9/2007 | Brown et al. | |
| 7,475,207 B2 | 1/2009 | Bromling et al. | |
| 7,577,722 B1 | 8/2009 | Khandekar et al. | |
| 7,613,890 B1 | 11/2009 | Meiri | |
| 7,949,637 B1 | 5/2011 | Burke | |
| 8,335,899 B1* | 12/2012 | Meiri et al. | 711/162 |

(Continued)

OTHER PUBLICATIONS

U.S. Appl. No. 12/932,080, filed Feb. 17, 2011, Meiri et al.

(Continued)

*Primary Examiner* — Robert Beausoliel, Jr.
*Assistant Examiner* — Arthur Ganger
(74) *Attorney, Agent, or Firm* — Muirhead and Saturnelli, LLC

(57) ABSTRACT

Transferring an application from a first site to a second site includes determining that the second site is a destination site for the application, causing writes by the application at the first site to be propagated semi-synchronously to the second site, transferring storage data from the first site to the second site, suspending operation of the application on the first site, and resuming operation of the application on the second site. The application may be a virtual machine or a host cluster capable of transitioning applications between cluster nodes. The virtual machine may be transferred from the first site to the second site by transferring an image of the virtual machine from the first site to the second site. The destination site may be selected by a user. The second site may be located remotely from the first site across an asynchronous distance.

20 Claims, 20 Drawing Sheets

(56) References Cited

U.S. PATENT DOCUMENTS

| | | | |
|---|---|---|---|
| 8,364,648 B1* | 1/2013 | Sim-Tang | G06F 17/30368 |
| | | | 707/674 |
| 8,578,204 B1 | 11/2013 | Ortenberg et al. | |
| 8,667,490 B1 | 3/2014 | van der Goot | |
| 8,868,874 B2* | 10/2014 | Wilkinson | G06F 11/2064 |
| | | | 711/161 |
| 2006/0031450 A1 | 2/2006 | Unrau et al. | |
| 2006/0230082 A1* | 10/2006 | Jasrasaria | G06F 11/2074 |
| 2007/0022264 A1* | 1/2007 | Bromling | G06F 11/2064 |
| | | | 711/162 |
| 2008/0320219 A1* | 12/2008 | Okada | G06F 11/1456 |
| | | | 711/114 |
| 2011/0099318 A1* | 4/2011 | Hudzia et al. | 711/6 |
| 2012/0054367 A1* | 3/2012 | Ramakrishnan et al. | 709/242 |
| 2013/0067471 A1* | 3/2013 | Kruglick | 718/1 |
| 2014/0025890 A1* | 1/2014 | Bert et al. | 711/118 |
| 2014/0033201 A1* | 1/2014 | Dawkins et al. | 718/1 |
| 2014/0215459 A1* | 7/2014 | Tsirkin | 718/1 |

OTHER PUBLICATIONS

U.S. Appl. No. 13/433,885, filed Mar. 29, 2012, Salamon et al.
U.S. Appl. No. 13/537,839, filed Jun. 29, 2012, Palekar et al.
U.S. Appl. No. 13/768,630, filed Feb. 15, 2013, Palekar et al.
EMC Corporation, "Using VMware Vsphere with EMC VPLEX," White paper h7118.2, Jul. 2011, 80 pp.

* cited by examiner

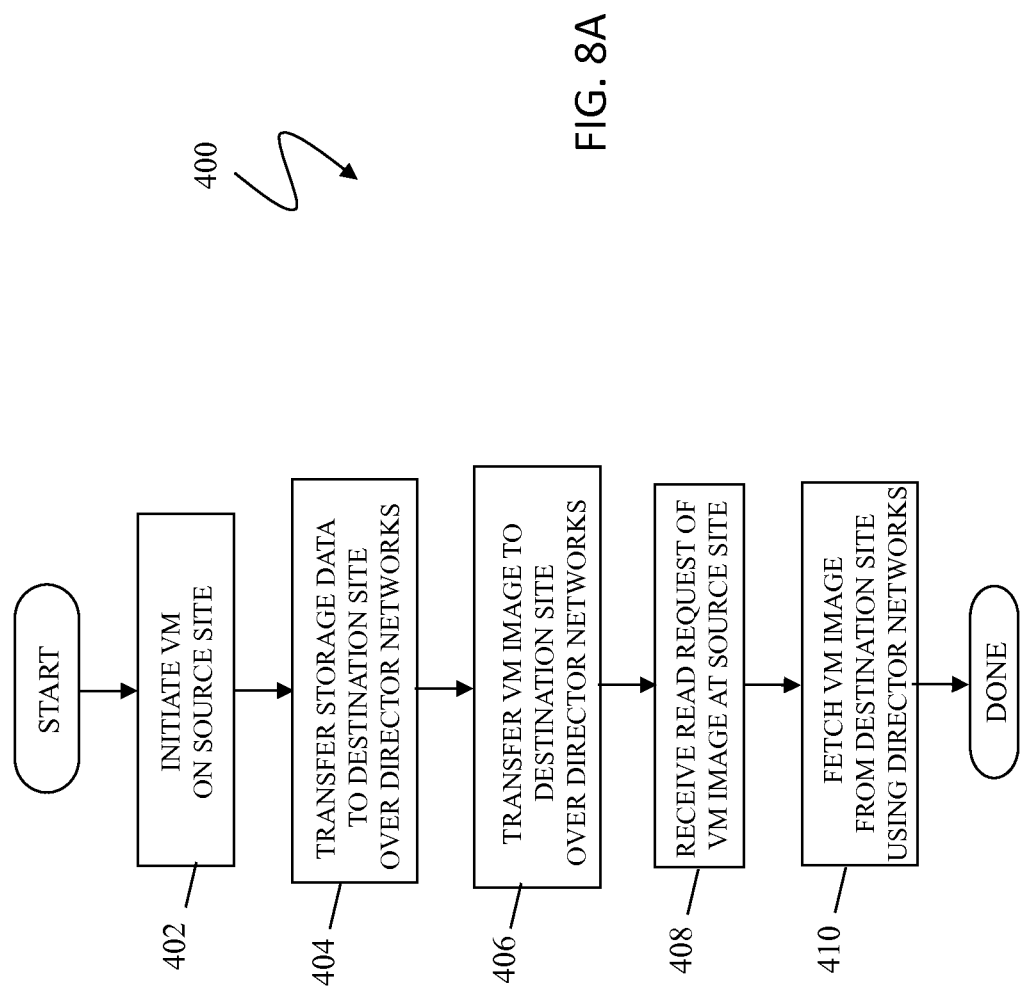

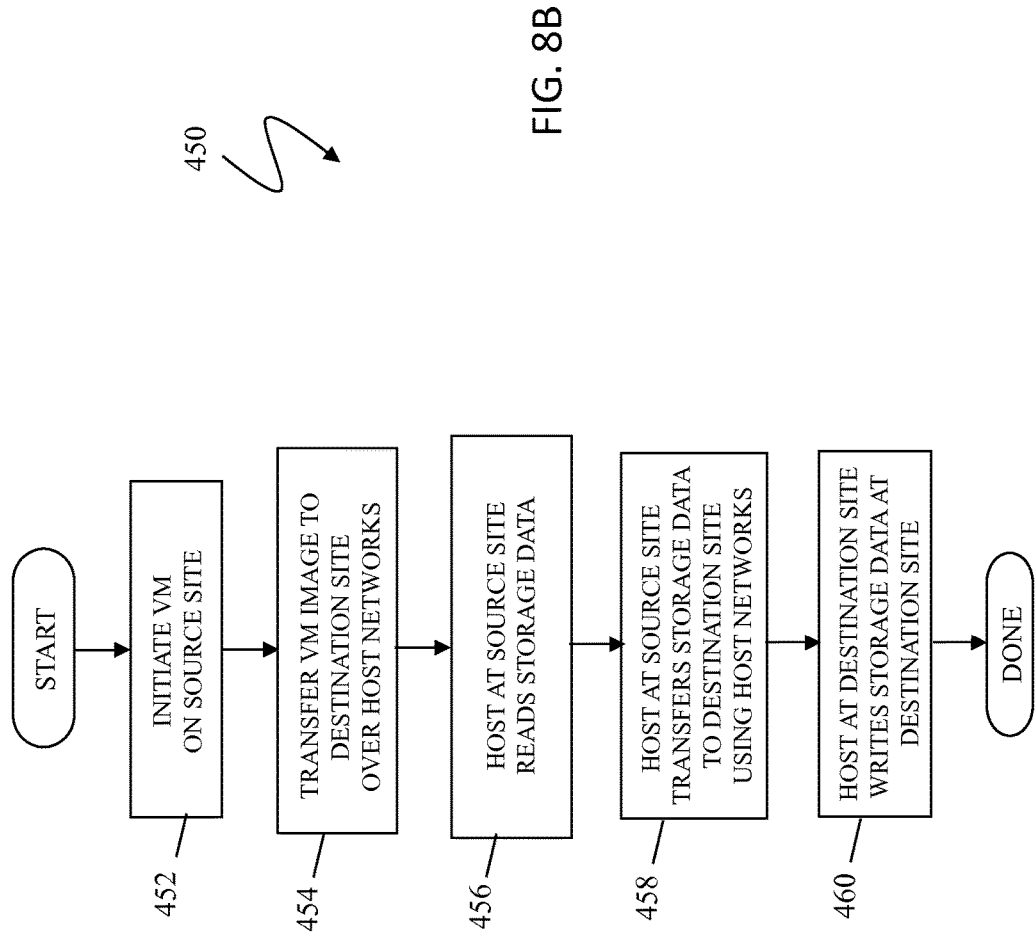

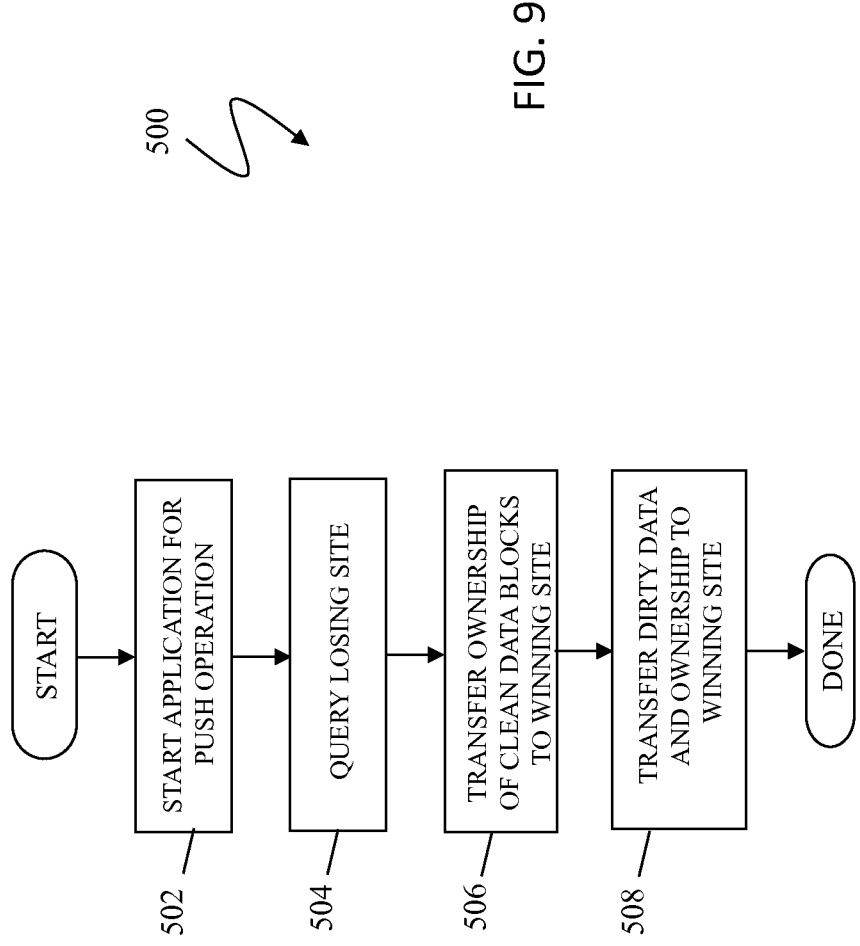

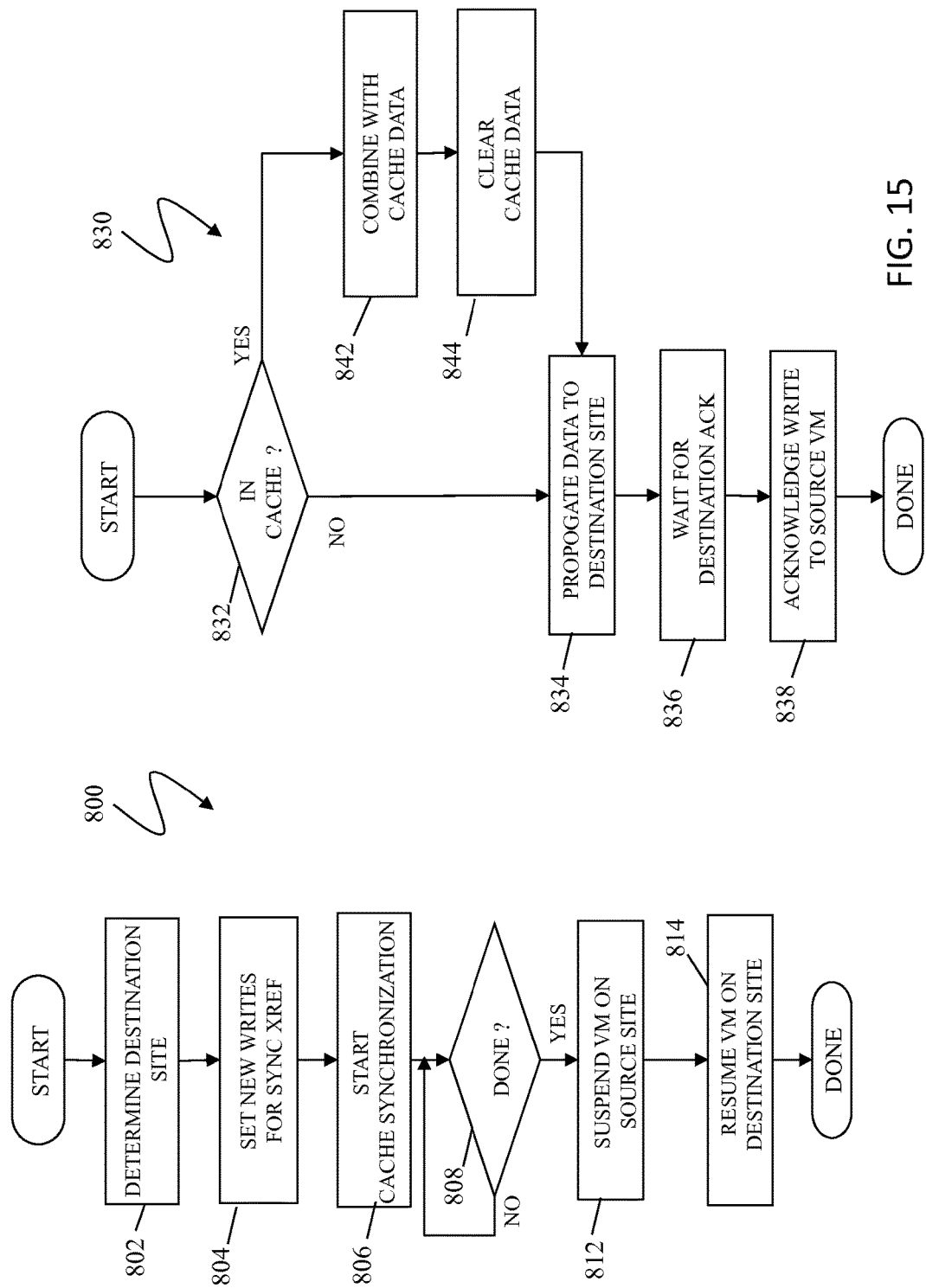

MIGRATING APPLICATIONS OVER ASYNCHRONOUS DISTANCES USING SEMI-SYNCHRONOUS ACCELERATION

TECHNICAL FIELD

This application is related to the field of data storage and, more particularly, to systems for managing data sharing over one or more networks.

BACKGROUND OF THE INVENTION

In current storage networks, and particularly storage networks including geographically remote directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary. Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. patent application Ser. No. 12/080,027 to Meiri et al., filed Mar. 31, 2008, entitled "Active/Active Remote Synchronous Mirroring," which are all incorporated herein by reference and are assigned to the assignee of the present application.

Transferring an application, such as a virtual machine (VM), from one site to another is relatively straightforward when the sites are in synchronous communication. However, sites that are geographically distant, and thus in asynchronous communication, present more of a challenge. Of course, in instances where the destination site is maintained in a consistent data state corresponding to the state of the source at an earlier point in time, it is possible to restart the application (e.g., a VM) at the destination site. However, data provided at the source after the time of the consistent state is lost, and for some applications, this is unacceptable. It is also possible to first suspend the application at the source site, wait for all of the data to be transferred, and then resume the application in its current state at the destination site. Although this avoids the difficulties associated with restarting the application, there may be an unacceptable delay while waiting for the data to be transferred prior to resuming the application at the destination site.

Accordingly, it is desirable to provide an effective and efficient system to address issues like those noted above for a distributed storage system.

SUMMARY OF THE INVENTION

According to the system described herein, transferring an application from a first site to a second site includes determining that the second site is a destination site for the application, causing writes by the application at the first site to be propagated synchronously to the second site, transferring storage data from the first site to the second site, suspending operation of the application on the first site, and resuming operation of the application on the second site. The application may be a virtual machine. The virtual machine may be transferred from the first site to the second site by transferring an image of the virtual machine from the first site to the second site. The destination site may be selected by a user. Each of the first site and second site may include at least one host cluster, at least one director cluster and at least one storage array. The second site may be located remotely from the first site across an asynchronous distance. Transferring an application from a first site to a second site may also include combining data from a cache at the source site with data being written by the application at the source site in response to writing application data when the cache at the source site contains data awaiting transfer to the destination site and the data from the cache corresponds to the application data.

According further to the system described herein, a non-transitory computer-readable medium containing software that transfers an application from a first site to a second site. The software includes executable code that causes writes by the application at the first site to be propagated synchronously to the second site, executable code that transfers storage data from the first site to the second site, executable code that suspends operation of the application on the first site, and executable code that resumes operation of the application on the second site. The application may be a virtual machine. The virtual machine may be transferred from the first site to the second site by transferring an image of the virtual machine from the first site to the second site. The destination site may be selected by a user. Each of the first site and second site may include at least one host cluster, at least one director cluster and at least one storage array. The second site may be located remotely from the first site across an asynchronous distance. The software may include executable code that combines data from a cache at the source site with data being written by the application at the source site in response to writing application data when the cache at the source site contains data awaiting transfer to the destination site and the data from the cache corresponds to the application data.

According further to the system described herein, an active/active system includes a first site, a second site located remotely from the first site, where each of the first site and the second site include at least one host cluster, at least one director cluster, and at least one storage array and a computer readable medium of at least one of: the host cluster or the director cluster that stores software for providing mobility of a virtual machine between the first site and the second site. The software includes executable code that causes writes by the application at the first site to be propagated synchronously to the second site, executable code that transfers storage data from the first site to the second site, executable code that suspends operation of the application on the first site, and executable code that resumes operation of the application on the second site. The application may be a virtual machine. The virtual machine may be transferred from the first site to the second site by transferring an image of the virtual machine from the first site to the second site. The destination site may be selected by a user. The second site may be located remotely from the first site across an asynchronous distance. The software may further include executable code that combines data from a cache at the source site with data being written by the application at the source site in response to writing application data when the cache at the source site contains data awaiting transfer to the destination site and the data from the cache corresponds to the application data.

According further to the system described herein, transferring an application from a first site to a second site includes determining that the second site is a destination site for the application, causing writes by the application at the first site to be propagated semi-synchronously to the second site, transferring storage data from the first site to the second site, suspending operation of the application on the first site, and resuming operation of the application on the second site. The application may be a virtual machine. The virtual machine may be transferred from the first site to the second site by transferring an image of the virtual machine from the first site to the second site. The destination site may be selected by a user. Each of the first site and second site may include at least one host cluster, at least one director cluster and at least one storage array. The second site may be located remotely from the first site across an asynchronous distance. Transferring an application from a first site to a second site may also include combining data from a cache at the source site with data being written by the application at the source site in response to writing application data when the cache at the source site contains data awaiting transfer to the destination site and the data from the cache corresponds to the application data.

According further to the system described herein, a non-transitory computer-readable medium containing software that transfers an application from a first site to a second site. The software includes executable code that causes writes by the application at the first site to be propagated semi-synchronously to the second site, executable code that transfers storage data from the first site to the second site, executable code that suspends operation of the application on the first site, and executable code that resumes operation of the application on the second site. The application may be a virtual machine. The virtual machine may be transferred from the first site to the second site by transferring an image of the virtual machine from the first site to the second site. The destination site may be selected by a user. Each of the first site and second site may include at least one host cluster, at least one director cluster and at least one storage array. The second site may be located remotely from the first site across an asynchronous distance. The software may include executable code that combines data from a cache at the source site with data being written by the application at the source site in response to writing application data when the cache at the source site contains data awaiting transfer to the destination site and the data from the cache corresponds to the application data.

According further to the system described herein, an active/active system includes a first site, a second site located remotely from the first site, where each of the first site and the second site include at least one host cluster, at least one director cluster, and at least one storage array and a computer readable medium of at least one of: the host cluster or the director cluster that stores software for providing mobility of a virtual machine between the first site and the second site. The software includes executable code that causes writes by the application at the first site to be propagated semi-synchronously to the second site, executable code that transfers storage data from the first site to the second site, executable code that suspends operation of the application on the first site, and executable code that resumes operation of the application on the second site. The application may be a virtual machine. The virtual machine may be transferred from the first site to the second site by transferring an image of the virtual machine from the first site to the second site. The destination site may be selected by a user. The second site may be located remotely from the first site across an asynchronous distance. The software may further include executable code that combines data from a cache at the source site with data being written by the application at the source site in response to writing application data when the cache at the source site contains data awaiting transfer to the destination site and the data from the cache corresponds to the application data.

BRIEF DESCRIPTION OF THE DRAWINGS

Embodiments of the system described herein are explained with reference to the several figures of the drawings, which are briefly described as follows.

FIG. 8A is a flow diagram showing a method for using the inter-cluster link (director networks) between director clusters of multiple sites in an active/active system according to an embodiment of the system described herein.

FIG. 8B is a flow diagram showing a method for using the inter-cluster link (host networks) between host clusters of multiple sites in an active/active system according to an embodiment of the system described herein.

FIG. 9 is a schematic illustration of a write order fidelity (WOF) pipeline and visualizes some details according to an embodiment of the system described herein.

FIG. 14 is a flow diagram showing a method for providing mobility of a virtual machine between a first site and a second site of an active/active system according to an alternative embodiment of the system described herein.

FIG. 15 is a flow diagram showing processing performed in connection with a write operation following synchronously propagating writes according to an embodiment of the system described herein.

DETAILED DESCRIPTION OF VARIOUS EMBODIMENTS

Figure 1:
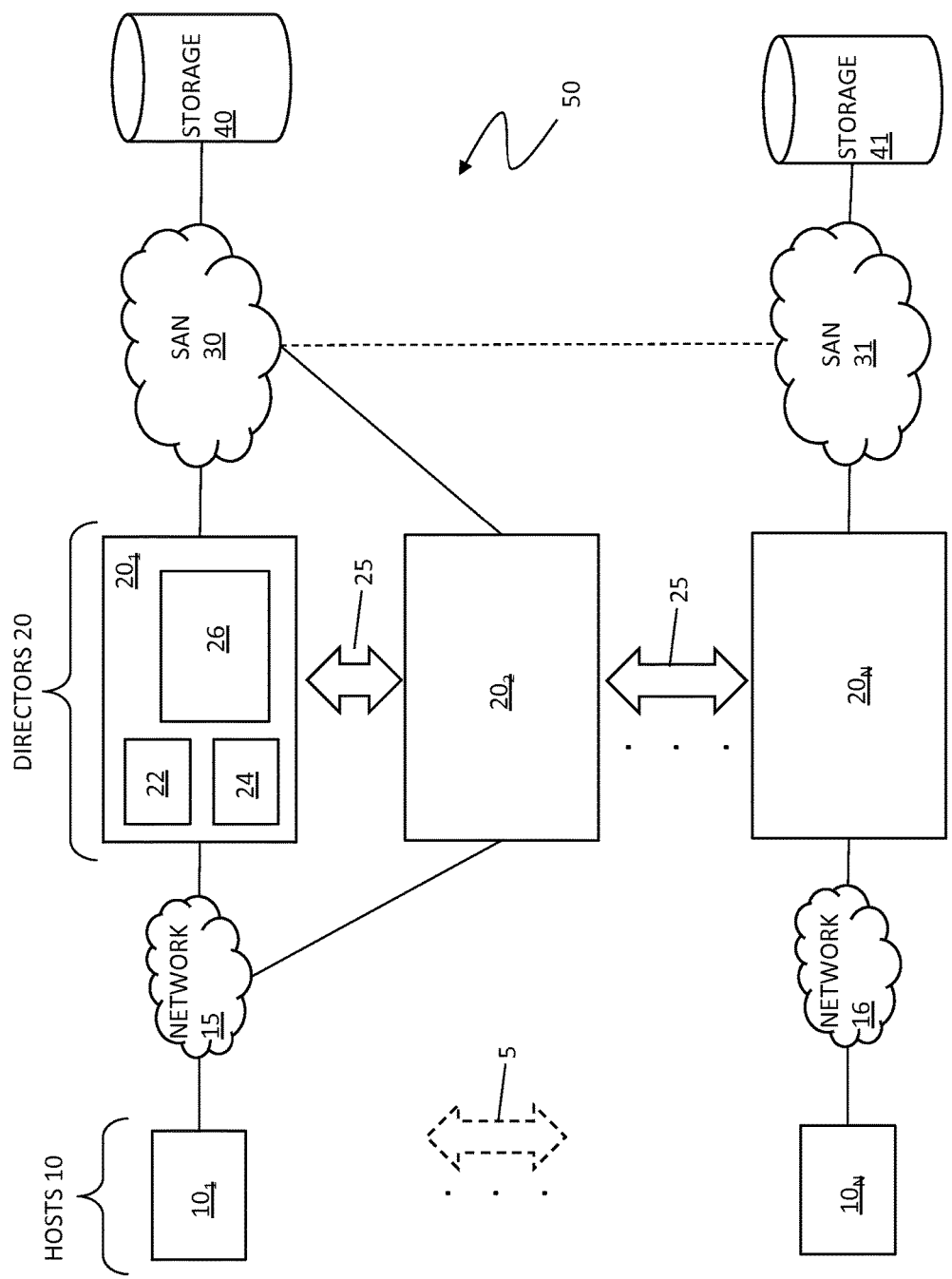
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 (10$_1$ to 10$_N$) are communicably coupled with a plurality of directors 20 (20$_1$, 20$_2$ to 20$_N$). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with the SAN networks 30, 31. Generally, a site may include one or more hosts and/or one or more storage devices.

Each of the directors 20 may also provide functionality in support of one or more hosts or host clusters together with one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with VSPHERE® server virtualization technology (SVT) and/or VPLEX product produced by VMware Inc. of Palo Alto, Calif. and EMC Corporation of Hopkinton, Mass., respectively. Of course, other hypervisors (or similar) may be used and, in some cases, the system described herein may be implemented using physical clustering servers. The system described herein may also be used in connection with an RDF storage product produced by EMC Corporation, such as a Symmetrix product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Any suitable networked director may be configured to operate as an access node with distributed cache manager functionality. For example, a distributed cache manager may be run on one or more desktop computers and/or virtual machines with a network connection.

According to the system described herein, a distributed storage system may enable a storage device to be exported from multiple distributed directors, which may be either appliances or arrays, for example. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using server virtualization software, one or more of the physical servers (e.g., the hosts 10) may be subdivided into a plurality of virtual machines. A virtual machine (VM) is a software implementation of a machine that executes programs like a physical machine Virtualization software allows multiple VMs with separate operating systems to run in isolation on the same physical machine. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VSPHERE® product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A virtual machine image is the image of the virtual machine as it resides in the host's memory. A virtual machine image may be obtained for an operating VM and transferred to another location where the VM continues execution from the state defined by the virtual machine image. In this way, the virtual machine image may be moved between different locations and processing thereafter continued without interruption.

In a virtualization environment, a centralized management software entity, such as the VCENTER™ product provided by VMware Corporation of Palo Alto, Calif., may provide a central point of control for managing, monitoring, provisioning and migrating virtual machines. The centralized management software entity may operate to control virtual machines in data centers and in connection with cloud computing including using both internal and external cloud infrastructures and hybrids thereof.

Figure 2:
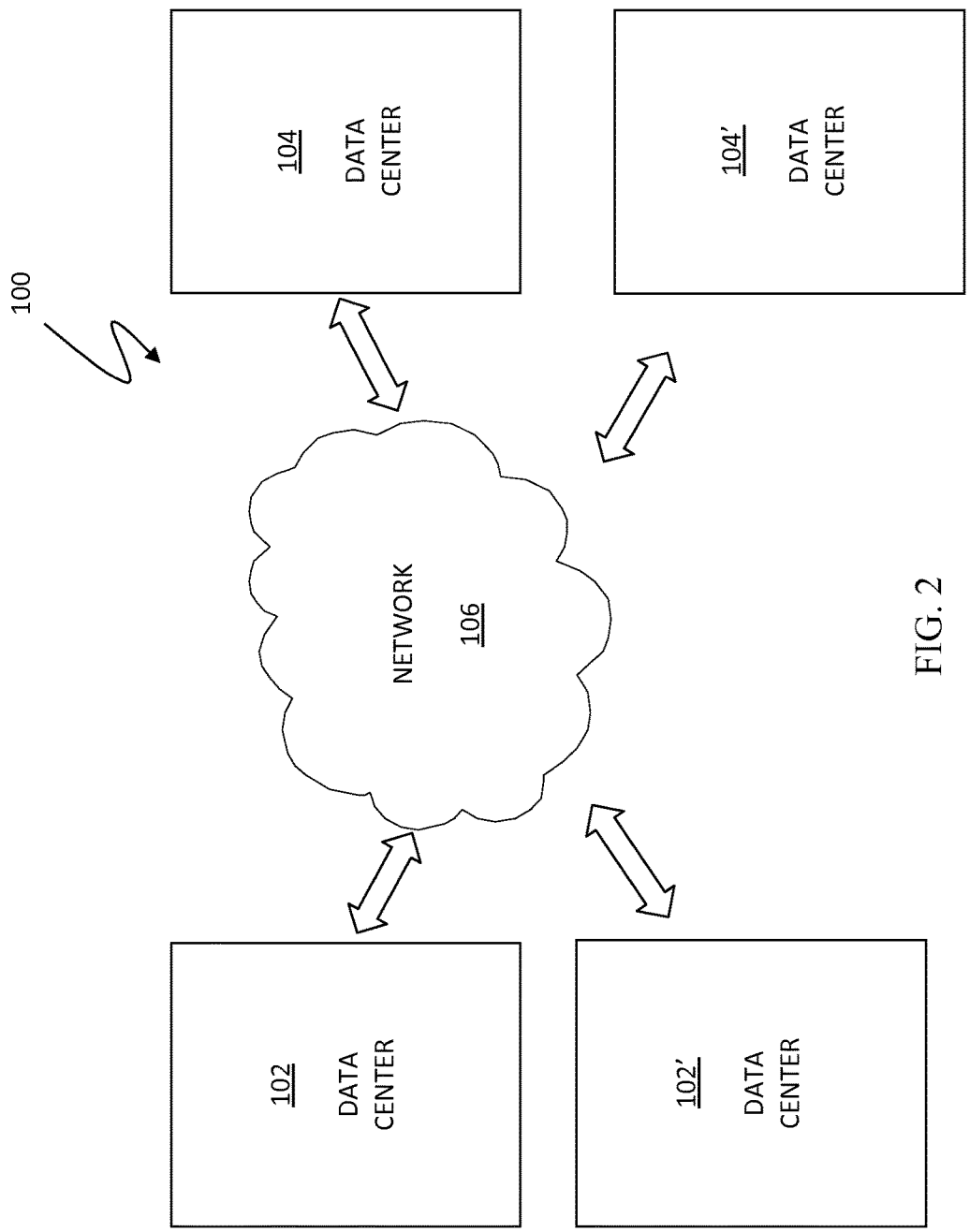
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs. The VMs may be configured using any appropriate server virtualization technology (SVT), such as that provided by VMware, Inc. of Palo Alto, Calif., including the VSPHERE® SVT, a suite of tools offering the ability to perform cloud computing utilizing enterprise-level virtualization products such as VMware's ESX and/or ESXi. The VSPHERE® SVT allows multiple VMs to run on any ESX host. Other SVT and/or hypervisor technology may be used including any appropriate server virtualization technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source in one of the data centers 102, 104 to a destination one of the data centers 102, 104. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," which is incorporated herein by reference and is assigned to the assignee of the present application. A product, such as EMC's VPLEX Geo and/or VPLEX Global, may be used to enable the resources of disparate storage systems in geographically dispersed data centers to be coordinated and utilized as a single pool of virtual storage. VPLEX Geo or Global provide for data mobility, availability and collaboration through active/active data over distance with the ability to non-disruptively move many VMs.

Figure 3:
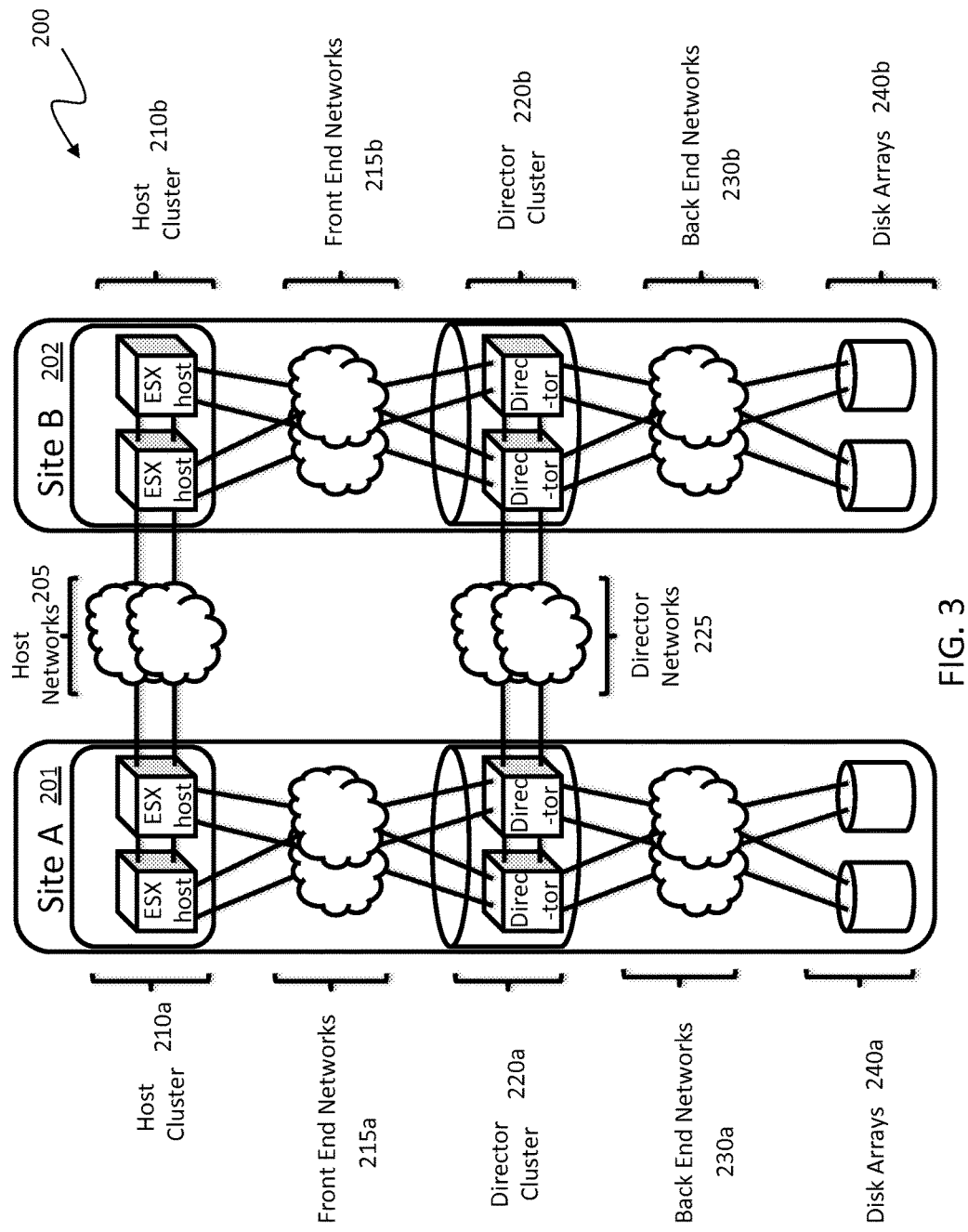
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include ESX hosts in an SVT cluster and director cluster 220a,b may include directors in a VPLEX cluster. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform I/O operations with the host clusters 210a,b, while the back end networks 230a,b allow the directors of the director clusters 220a,b to perform I/O on the disk arrays 240a,b. One or more host networks 205, such as SVT Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., SVT cluster) may be connected in such a way that VMs can keep their network (e.g., IP, FC, IB) addresses when migrating between clusters (for example, by means of a vLan or an open vSwitch). In an embodiment, VPLEX Geo may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween. It should be noted that the active/active system described herein may also be used in active/passive functioning as appropriate or desired.

I/O access may be provided to distributed volumes in an active/active system with two sites separated by an asynchronous distance (i.e., a distance at which latencies introduced by synchronous communication are unacceptable). For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the oldest dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. As noted elsewhere herein, known techniques may provide write order consistency by bucketing writes in what are called deltas and providing the consistency on a delta boundary basis (see, e.g. U.S. Pat. No. 7,475,207 to Bromling et al.).

Suspend/resume migration processing may involve suspending (i.e., pausing) a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together.

Figure 4:
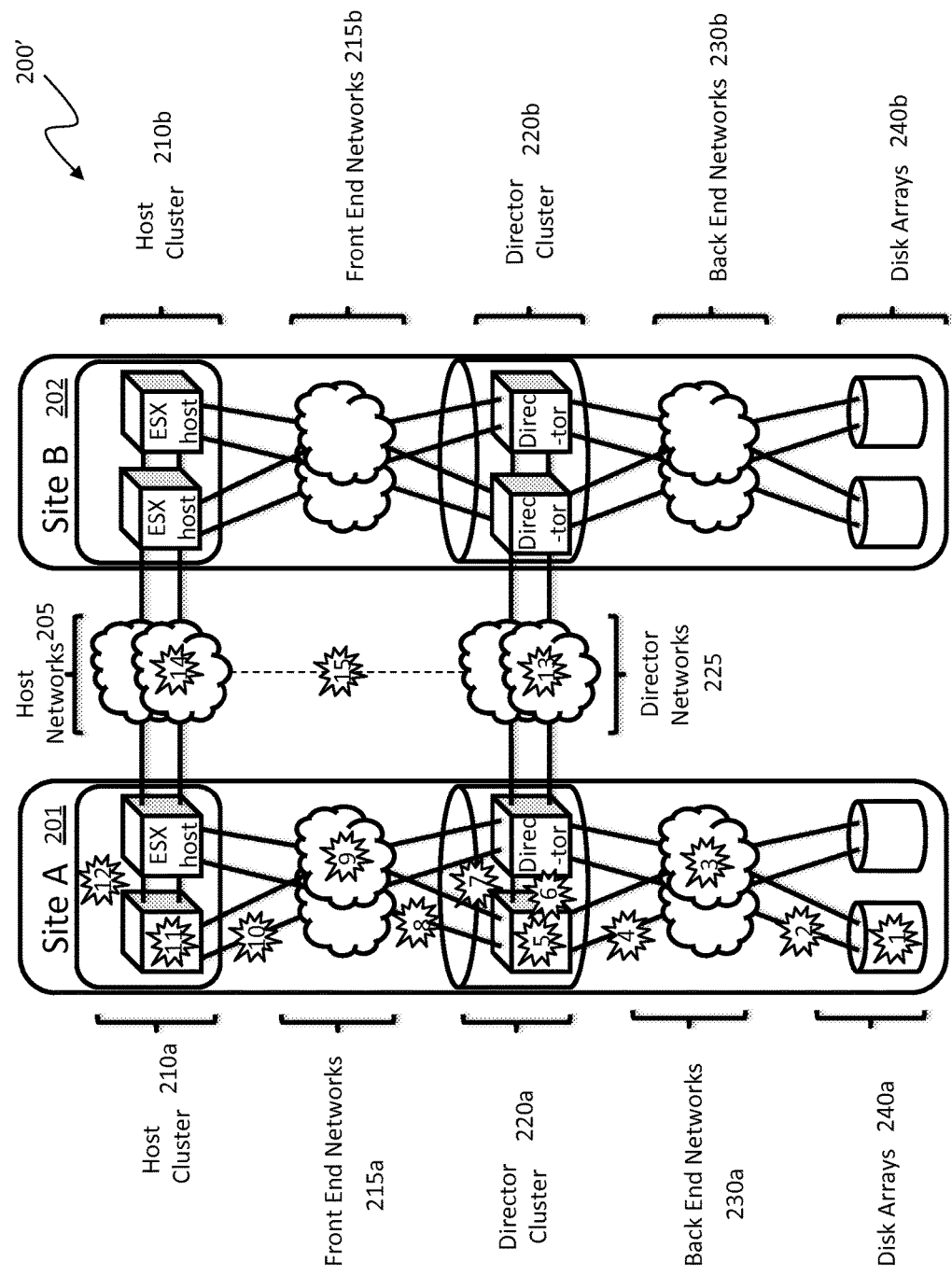
FIG. 4 is a schematic illustration showing failure scenarios in a distributed storage system in accordance with various embodiments of the system described herein.

FIG. 4 is a schematic illustration showing failure scenarios, identified as 1-15, in a distributed storage system 200' having multiple sites like that of distributed storage system 200 according to various embodiments of the system described herein. Table 1 shows the observed behaviors of the different failure scenarios, as schematically shown in FIG. 4, in connection with suspending and resuming migrations of VMs according to various embodiments of the system described herein. The specific embodiments described in Table 1 are discussed in connection with the use of VPLEX Geo clusters (director clusters 220a,b) and SVT clusters (host clusters 210a,b). It is further noted that in connection with characterizing failure scenarios and identifying an appropriate site as a winner site for continuing operations, a cluster witness node may be used. Reference is made, for example, to U.S. patent application Ser. No. 12/930,121 to Ortenberg et al., filed Dec. 29, 2010, and entitled "Witness Facility for Distributed Storage System," which is incorporated herein by reference, that providing examples of features and uses of a witness node in a distributed storage system in connection with determining failure conditions. It is noted that conditions and/or user preferences may cause a site to be indicated a preferred site; however, in the event of certain failures, a winner site may be other than the preferred site and may cause re-selection of a preferred site.

TABLE 1

| Scenario | VPLEX Geo behavior | SVT behavior |
|---|---|---|
| 1. Array failure | VPLEX continues providing access to the distributed volume using the remaining (remote) array. When access to the failed array is restored or the array is replaced, the volume on the affected array will be resynchronized automatically. | No change. |
| 2a. Array link failure (redundant) | Directors use all available paths to an array. All directors in the affected cluster lose one path to one array, but have one remaining path to the array. | No change. |
| 2b. Array link failure (non-redundant) | See scenario "1. Array failure." | — |
| 3a. Back end network failure (redundant) | Directors use all available paths to an array. All directors in the affected cluster lose one path to all local arrays, but one redundant path between the local directors and the local arrays remains (through the redundant back end network). | No change. |
| 3b. Back end network failure (non-redundant) | All directors lose both paths to all local arrays. Hence these directors lose access to the local mirror legs of their distributed volumes. Reads to the affected volumes will be served from the remote mirror legs. Writes to the affected volumes succeed on the remote mirror leg and cause the local mirror legs to be marked out-of-date. No rebuilds will be started due to lack of array visibility. | No change. |
| 4a. Back end link failure (redundant) | Directors use all available paths to an array. One director loses one path to all local arrays present, but one path to these arrays remains. | No change. |
| 4b. Back end link failure (non-redundant) | One director loses both paths to all local arrays. Hence this director loses access to the local mirror legs of its distributed volumes. Reads to the affected volumes will be served from an alternate local director with local access to the local mirror legs of the distributed volume, as long as there is such director with local visibility; if not, reads will be served by the remote mirror legs. Writes to the affected volumes succeed locally as long as there is a local director with local access. If there isn't, writes succeed on the remote mirror leg only and cause the local mirror legs to be marked out-of-date, which will cause other directors to start rebuilding the distributed volumes (which will not succeed as long as hosts write to the distributed volumes through the affected director). | No change. |
| 5a. VPLEX director failure (redundant) | VPLEX protected the user data on another director. This protection copy will be take the place of the original copy in VPLEX's cache coherence protocol and will eventually be flushed to the back end array. | The ESX hosts use all available paths to VPLEX. Under this scenario multiple ESX hosts lost paths to one director, but one or more paths remain to one or more unaffected VPLEX directors. |
| 5b. VPLEX director failure (non-redundant) | See scenarios "7. VPLEX cluster failure." | — |
| 6a. VPLEX local communication link failure (redundant) | Directors use all available paths to communicate to other directors. Under this scenario one director lost one path to each other local director, but another path to each other local director remains. | No change. |

TABLE 1-continued

| Scenario | VPLEX Geo behavior | SVT behavior |
| --- | --- | --- |
| 6b. Local VPLEX communication link failure (non-redundant) | The affected VPLEX director will be expelled, effectively removing the export of the distributed volume from that director. | No change. |
| 6c. Local VPLEX communication network failure (redundant) | A VPLEX director uses all available paths to communicate to other directors. All directors lost one path to all other local directors, but one path to each other local director remains (through the redundant communication network). | No change. |
| 6d. Local VPLEX communication network failure (non-redundant) | VPLEX single: one director is expelled and the other keeps running. VPLEX dual and quad: the VPLEX local site is expelled. | VPLEX single: No change. VPLEX dual (two cluster engines) and quad (four cluster engines): All local VMs go into a permanent device loss state. VMs have to be restarted manually on the surviving cluster. |
| 7a. Non-preferred VPLEX cluster failure observed by the cluster witness | The cluster witness tells the preferred cluster to proceed serving I/O. Once the failed cluster comes back online all distributed volumes will be resynchronized. | VMs and ESX hosts talking to the failed, non-preferred cluster see all paths to the VPLEX array disappear (All Paths Down). SVT host adapter (HA) does not restart VMs across geography so all these VMs are unavailable until the failed, non-preferred VPLEX cluster comes back online or the user moves the VMs to the surviving, preferred VPLEX cluster manually. |
| 7b. Non-preferred VPLEX cluster failure not observed by the cluster witness | The preferred cluster proceeds serving I/O. Once the failed, non-preferred cluster comes back online all distributed volumes will be resynchronized. | VMs and ESX hosts talking to the failed, non-preferred VPLEX cluster see all paths to the storage disappear (All Paths Down). SVT HA does not restart VMs across geography so all these VMs are unavailable until the failed, non-preferred VPLEX cluster comes back online or the user moves the VMs to the surviving, preferred VPLEX cluster manually. |
| 7c. Preferred VPLEX cluster failure observed by the cluster witness | Cluster witness overrules the preference and tells the non-preferred cluster to proceed serving I/O. Once the cluster comes back online all distributed volumes will be resynchronized. | VMs and ESX hosts talking to the failed, preferred cluster see all paths to the storage disappear (All Paths Down or APD in SVT terminology). SVT HA does not restart VMs across geography so all these VMs are unavailable until the failed, preferred VPLEX cluster comes back online or the user moves the VMs to the surviving, non-preferred VPLEX cluster manually. |
| 7d. Preferred VPLEX cluster failure not observed by the cluster witness | The non-preferred cluster stops serving I/O. Once the failed, preferred cluster comes back online I/O will proceed on both clusters. | All VMs and ESX hosts see all paths to the VPLEX array disappear (All Paths Down or APD in SVT terminology). |
| 8a. Front end link failure (redundant) | No change. | ESX hosts use all available paths to the VPLEX array. All ESX hosts lose one path to one director, but one or more paths remain to the VPLEX array. |
| 8b. Front end link failure (non-redundant) | No change. | ESX hosts use all available paths to the VPLEX array. All ESX hosts lose both paths to one director, but two paths remain to one or more unaffected directors. |
| 9a. Front end network failure (redundant) | No change. | ESX hosts use all available paths to the VPLEX array. All ESX hosts and all VPLEX directors attached to this back end network lost one or more paths, but other paths remain (through the redundant front end network). |
| 9b. Front end network failure (non-redundant) | No change. | All ESX hosts in one cluster lose all paths to the local VPLEX array. Depending on the VM's operating system and whether disk I/O is happening, the VM fails or waits for the front end network to return. Failed VMs have to be restarted. |

TABLE 1-continued

| Scenario | VPLEX Geo behavior | SVT behavior |
| --- | --- | --- |
| 10a. Host link failure (redundant) | No change. | ESX hosts use all available paths to the VPLEX array. One ESX host loses one path, but one path remains to the VPLEX array. |
| 10b. Host link failure (non-redundant) | No change. | One ESX host loses both paths to the VPLEX array, resulting in a Persistent Device Loss for all volumes. SVT HA will restart all affected VMs on another ESX host in the same cluster. |
| 11a. ESX host failure (redundant) | No change. | SVT HA restarts the VMs that were running on the failed ESX host on a redundant ESX host. |
| 11b. ESX host failure (non-redundant) | See scenario "12. SVT Cluster failure." | — |
| 11c. VM failure | No change. | SVT HA restarts the failed VM on any ESX host in the same cluster. |
| 12. SVT Cluster failure | No change. | Failed VMs have to be restarted manually. |
| 13a. Inter-site VPLEX communication network failure (redundant) | VPLEX sites use all available paths to communicate to each other. Under this scenario one inter-site communication network remains. | No change. |
| 13b. Inter-site VPLEX communication network failure (non-redundant) during regular operation | Preferred cluster: No change. Non-preferred cluster: Directors in the non-preferred site suspend I/O. | Preferred cluster: No change. Non-preferred cluster: No change, because all VMs are running in the preferred site. |
| 13c. Inter-site VPLEX communication network failure (non-redundant) during a migration | Preferred or source cluster: No change Non-preferred or destination cluster: Directors in the non-preferred or destination site suspend I/O. | Preferred or source cluster: The VMs that are migrating have to be restarted manually. The VMs that were running in the preferred site keep running. Non-preferred or destination cluster: No change because all VMs are running in the preferred or source site. |
| 13d. Inter-site VPLEX communication network failure (non-redundant) shortly after a migration | Preferred (or formerly destination) cluster: No change. Non-preferred (or formerly source) cluster: Directors in the non-preferred or source site suspend I/O. | Preferred (or formerly destination) cluster: No change. Non-preferred (or formerly source) cluster: No change, because all VMs are running in the preferred site. |
| 14a. Inter-cluster SVT network failure (redundant) | No change. | All ESX hosts can still see each other over the redundant inter-cluster SVT network. |
| 14b. Inter-cluster SVT network failure (non-redundant) | No change. | ESX hosts in different clusters can no longer see each other. VMs remain running and can only be migrated to ESX hosts within their current cluster. |
| 15a. Inter-site VPLEX communication network failure (non-redundant) plus inter-cluster SVT network failure (non-redundant) during regular operation | Preferred cluster: No change. Non-preferred cluster: Directors in the non-preferred cluster suspend I/O. | Preferred cluster: No change. Non-preferred cluster: No change, because all VMs are running in the preferred cluster. |
| 15b. Inter-site VPLEX communication network failure (non-redundant) plus inter-cluster SVT network failure (non-redundant) during a migration | Preferred or source cluster: No change. Non-preferred or destination cluster: Directors in the non-preferred or destination cluster suspend I/O. | Preferred or source cluster: The VMs that are migrating have to be restarted in the source cluster because the migration fails. The VMs that were running in the preferred cluster keep running. Non-preferred or destination cluster: No change because no VMs are yet running in this cluster. |
| 15c. Inter-site VPLEX communication network failure | Preferred (or formerly destination) cluster: No change. Non-preferred (or formerly source) | Preferred (or formerly destination) cluster: No change. Non-preferred (or formerly source) |

TABLE 1-continued

| Scenario | VPLEX Geo behavior | SVT behavior |
| --- | --- | --- |
| (non-redundant) plus inter-cluster SVT network failure (non-redundant) shortly after a migration | cluster: Directors in the non-preferred or source cluster suspend I/O. | cluster: No change, because no VMs are running in this cluster anymore. |

Failures may also occur when a VM is migrated while performing I/O operations. The migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays.

In various embodiments, many of the failure scenarios for VM migration may result in the same behavior as for that of suspend/resume migration failure behavior results. Table 2 describes the failure scenarios where the VM migration (e.g., vMotion) results in different behaviors as compared with the suspend/resume migration processing of Table 1. Note that in Table 2, the identified scenarios from Table 1 are split in two: one for the case where dirty data is on the non-preferred cluster and one where dirty data is not on the non-preferred cluster.

TABLE 2

| Scenario | VPLEX Geo behavior | SVT behavior |
| --- | --- | --- |
| 13A. Inter-site VPLEX communication network failure (non-redundant) during regular operation without dirty data in the non-preferred cluster | Preferred cluster: Directors in the preferred cluster keep serving I/O. Non-preferred cluster: Directors in the non-preferred cluster stop serving I/O until the inter-site VPLEX communication network returns. | Preferred cluster: No change. Non-preferred cluster: VMs can no longer access the VPLEX array. They can wait for the storage to return or they can be restarted manually at the preferred cluster. |
| 13B. Inter-site VPLEX communication network failure (non-redundant) during regular operation with dirty data in the non-preferred cluster | Preferred cluster: Directors in the preferred cluster discard some recently written data (to directors in either cluster). VPLEX rolls back to a write-order consistent volume image and suspends I/O. The user resumes I/O after restarting all ESX hosts and VMs present in the preferred cluster by issuing an appropriate command. Non-preferred cluster: Directors in the non-preferred cluster suspend I/O until the inter-site communication network returns and the user resumes I/O to indicate that all ESX hosts and remaining VMs are restarted. Writes to distributed volumes on the directors in the preferred cluster after the inter-site communication failure happened, are present on the directors in the non-preferred cluster. | Preferred cluster: ESX hosts and VMs should be restarted to find out what data is discarded by the VPLEX array. Non-preferred cluster: VMs can no longer access storage. They will have to be restarted manually on either the preferred cluster or the non-preferred cluster. ESX hosts need to be restarted. |
| 13C. Inter-site VPLEX communication network failure (non-redundant) during vMotion without dirty data in the non-preferred cluster | Same VPLEX Geo behaviors as in scenario "13A. Inter-site VPLEX communication network failure (non-redundant) during regular operation without dirty data in the non-preferred cluster." | Same SVT behaviors as in scenario "13A. Inter-site VPLEX communication network failure (non-redundant) during regular operation without dirty data in the non-preferred cluster." VMs of failed vMotions have to be restarted manually. |
| 13D. Inter-site VPLEX communication network failure (non-redundant) during dirty data in the non-preferred cluster | Same VPLEX Geo behaviors as in scenario "13B. Inter-site VPLEX communication network failure (non-redundant) during regular operation with data in the non-vMotion with preferred." | Same SVT behaviors as in scenario "13B. Inter-site VPLEX communication network failure (non-redundant) during regular operation with dirty data in the non-preferred cluster." VMs of failed vMotions have to be restarted manually. |

TABLE 2-continued

| Scenario | VPLEX Geo behavior | SVT behavior |
|---|---|---|
| 13E. Inter-site VPLEX communication network failure (non-redundant) shortly after vMotion without dirty data in the non-preferred cluster | Same VPLEX Geo behaviors as in scenario "13A. Inter-site VPLEX communication network failure (non-redundant) during regular operation without dirty data in the non-preferred cluster." | Same SVT behaviors as in scenario "13A. Inter-site VPLEX communication network failure (non-redundant) during regular operation without dirty data in the non-preferred cluster." The just vMotioned VMs have to be restarted manually. |
| 13F. Inter-site VPLEX communication network failure (non-redundant) shortly after vMotion with dirty date in the non-preferred cluster | Same VPLEX Geo behaviors as in scenario "13B. Inter-site VPLEX communication network failure (non-redundant) during regular operation with dirty data in the non-preferred cluster." | Same SVT behaviors as in scenario "13B. Inter-site VPLEX communication network failure (non-redundant) during regular operation with dirty data in the non-preferred cluster." The just vMotioned VMs have to be restarted manually. |
| 15A. Inter-site VPLEX communication network failure (non-redundant) plus inter-cluster SVT network failure (non-redundant) during regular operation without dirty data in both VPLEX clusters | Same VPLEX Geo behaviors as in scenario "13A. Inter-site VPLEX communication network failure (non-redundant) during regular operation without dirty data in the non-preferred cluster." | Same SVT behaviors as in scenario "13A. VPLEX inter-site communication network failure (non-redundant) during regular operation without dirty data in the non-preferred cluster." vMotion between the SVT clusters is not possible until the inter-cluster SVT network returns. |
| 15B. Inter-site VPLEX communication network failure (non-redundant) plus inter-cluster SVT network failure (non-redundant) during regular operation with dirty data in both VPLEX clusters | Same VPLEX Geo behaviors as in scenario "13B. Inter-site VPLEX communication network failure (non-redundant) during regular operation with dirty data in the non-preferred cluster." | Same SVT behaviors as in scenario "13B. Inter-site VPLEX communication network failure (non-redundant) during regular operation with dirty data in the non-preferred cluster." vMotion between the SVT clusters is not possible until the inter-cluster SVT network returns. |
| 15C. Inter-site VPLEX communication network failure (non-redundant) plus inter-cluster SVT network failure (non-redundant) during vMotion without dirty data in the non-preferred VPLEX cluster | Same VPLEX Geo behaviors as in scenario "13A. Inter-site VPLEX communication network failure (non-redundant) during regular operation without dirty data in the non-preferred cluster." | Same SVT behaviors as in scenario "13A. Inter-site VPLEX communication network failure (non-redundant) during regular operation without dirty data in the non-preferred cluster." vMotion between the SVT clusters is not possible until the inter-cluster SVT network returns. VMs of failed vMotions need to be restarted manually. |
| 15D. Inter-site VPLEX communication network failure (non-redundant) plus inter-cluster SVT network failure (non-redundant) during vMotion with dirty data in the non-preferred VPLEX cluster | Same VPLEX Geo behaviors as in scenario "13B. Inter-site VPLEX communication network failure (non-redundant) during regular operation with dirty data in the non-preferred cluster." | Same SVT behaviors as in scenario "13B. Inter-site VPLEX communication network failure (non-redundant) during regular operation with dirty data in the non-preferred cluster." vMotion between the SVT clusters is not possible until the inter-cluster SVT network returns. VMs of failed vMotions need to be restarted manually. |
| 15E. Inter-site VPLEX communication network failure (non-redundant) plus inter-cluster SVT network failure (non-redundant) shortly after vMotion without dirty data in the non-preferred VPLEX cluster | Same VPLEX Geo behaviors as in scenario "13A. Inter-site VPLEX communication network failure (non-redundant) during regular operation without dirty data in the non-preferred cluster." | Same SVT behaviors as in scenario "13A. VPLEX inter-site communication network failure (non-redundant) during regular operation without dirty data in the non-preferred cluster." vMotion between the SVT clusters is not possible until the inter-cluster SVT network returns. Just vMotioned VMs need to be restarted manually. |
| 15F. Inter-site VPLEX communication network failure | Same VPLEX Geo behaviors as in scenario "13B. Inter-site VPLEX communication network failure | Same SVT behaviors as in scenario "13B. VPLEX inter-site communication network failure (non- |

TABLE 2-continued

| Scenario | VPLEX Geo behavior | SVT behavior |
| --- | --- | --- |
| (non-redundant) plus inter-cluster SVT network failure (non-redundant) shortly after vMotion with dirty data in the non-preferred VPLEX cluster | (non-redundant) during regular operation with dirty data in the non-preferred cluster." | redundant) during regular operation with dirty data in the non-preferred cluster." vMotion between the SVT clusters is not possible until the inter-cluster SVT network returns. Just vMotioned VMs need to be restarted manually. |

Figure 5:
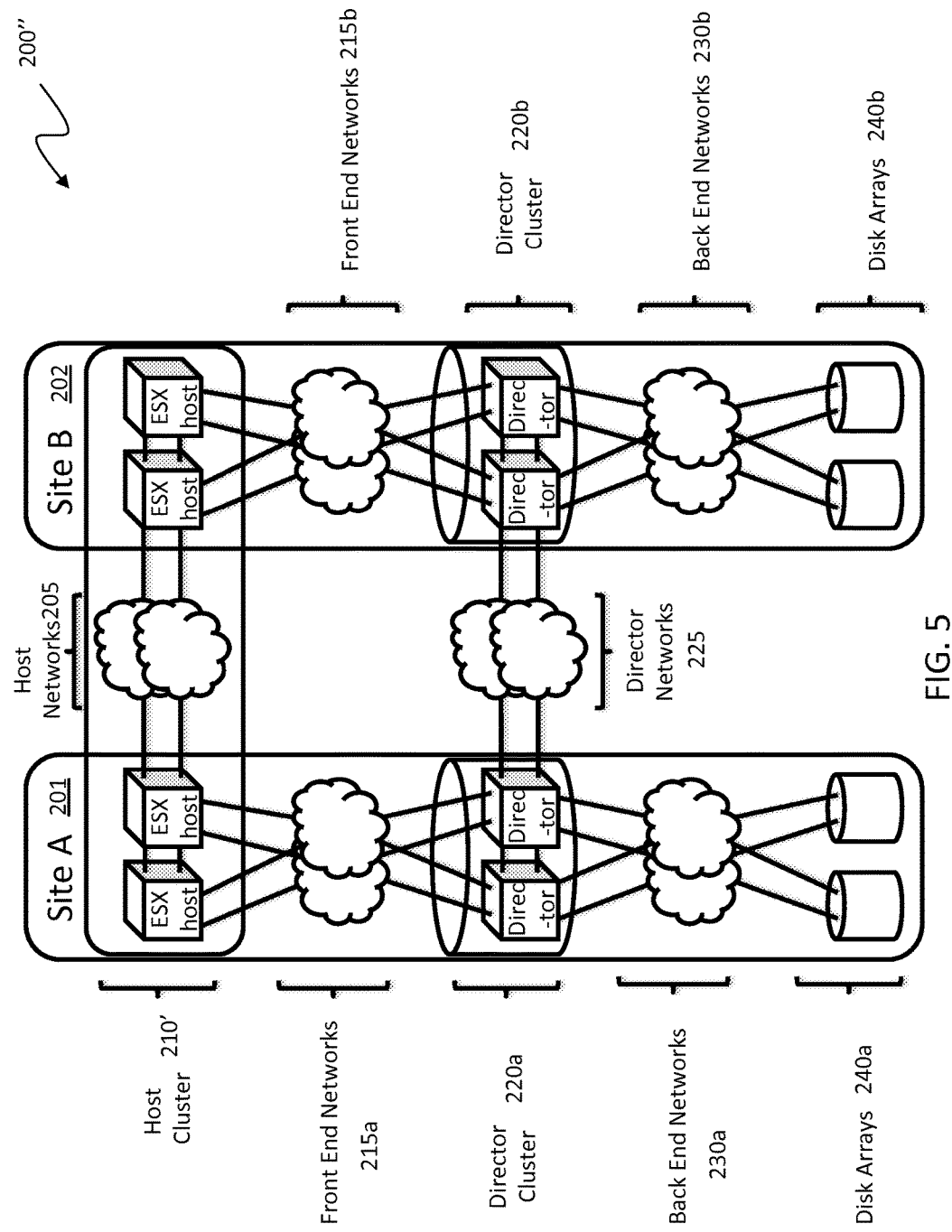
FIGS. 5 and 6 show alternative configurations of distributed storage systems that may be used in accordance with embodiments of the system described herein.
Figure 6:
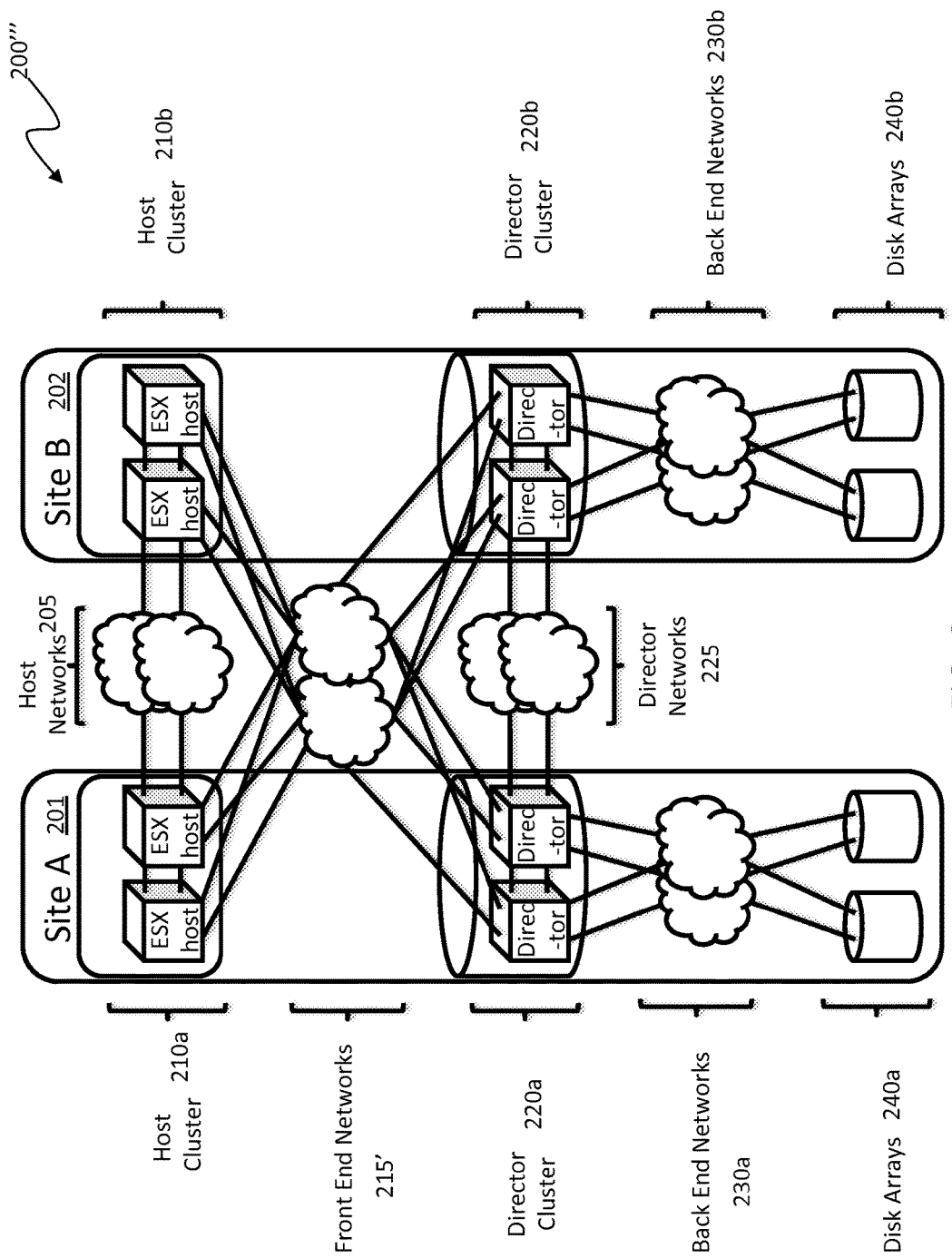

FIGS. 5 and 6 show alternative configurations for distributed storage systems that may be used in accordance with embodiments of the system described herein. In FIG. 5, a distributed storage system 200" is shown that includes a host cluster 210' as a distributed processing layer operating across the multiple sites 201, 202 and otherwise having elements like that discussed elsewhere herein. In FIG. 6, a distributed storage system 200'" is shown in which the front end networks 215' are shown operating as an external network accessed by each of the sites 201, 202 and otherwise having elements like that discussed elsewhere herein.

Once a director cluster (e.g., VPLEX Geo) is in a configuration such that one additional failure (or a limited number of additional failures) would result in Data Unavailability (DU) in a site according to the system described herein, it may start taking proactive measures to prevent this DU from happening. In other words, the system may transition towards an active/passive model. This may involve determining which site is a less vulnerable or otherwise preferred site in the event of the failure. Thereafter, the system may migrate all VMs to the less vulnerable (preferred) site (away from the more vulnerable site). If both sites are vulnerable to the same degree, the VMs are migrated to the customer's indicated preferred site. The director cluster (VPLEX) may initiate these migrations by specifying a "must" preference through an interface to a centralized management software entity. According to various embodiments, a must preference from VPLEX to SVT indicates on what ESX hosts VMs must be running in order to have and retain access to a specific virtual volume. A must preference from SVT to VPLEX indicates on what directors a virtual volume must survive in order for VMs to have and retain access to it. Contrast this to a "should" preference for where the winning clusters contains the same volume image as the losing or stopped cluster. A should preference from VPLEX to SVT indicates on what ESX hosts VMs should ideally be (this is a useful preference for VPLEX Metro). A should preference from SVT to VPLEX indicates on what directors a virtual volume should ideally survive. The migrating of VMs to the site with access to its array may improve I/O performance.

In embodiments like that discussed above, VPLEX Geo or Global, in combination with an SVT, may proactively migrate VMs to ensure that one additional failure (or a limited number of additional failures) will not cause a DU event. Of course if the additional failure happens before the VMs are all moved the DU event can still be encountered. Once an SVT has a vulnerability where one additional failure (or a limited number of additional failures) results in lack of resources to run all VMs in one site or to move all VMs to one site, it should notify VPLEX about the situation. This may result in overruling the customer's indicated preferred site. Depending on the nature of the resource problem a should or must preference is given. Ideally, a should preference may be used when all VMs can run on one site but some resources become overcommitted based on limits in Server Virtualization Technology (SVT) resource allocations. A must preference may be used when VMs can no longer run on one site because of Reservations specified in SVT Resource Allocation. A must preference may also be used when the SVT inter-cluster link becomes vulnerable.

In another embodiment, when both clusters contain dirty cache data, the director clusters 220a,b may discard some of the last writes in order for the customer to carry on operations. As further discussed elsewhere herein, the director clusters 220a,b may rollback the volume image to a write order consistent image, which means that an image from some prior point in time will be restored.

According to various embodiment of the system described herein, it may be advantageous to avoid occurrences of VM data rollback, particular in connection with addressing a situation where a last independent inter-cluster link fails during or shortly after a VM migration and causes not all data to be available on the cluster that is the target of the VM migration.

In an embodiment, the system described herein may provide for avoiding rollback of the distributed volume by writing to the distributed volume from only one cluster. By making sure that all the VMs that are accessing a certain shared file system, such as VMFS for VSPHERE®, and/or NTFS for Hyper-V, on a distributed volume are in the cluster of the preferred site, it may not be necessary to rollback when a link failure occurs. This does mean that the system is used in an active/passive fashion on a cluster level. All VMs accessing the same distributed volume may have to be migrated together by suspending all the VMs on the source ESX host cluster, synchronizing the dirty blocks from the source director cluster to the destination director cluster, moving the cluster preference to the destination cluster, and resuming all the VMs on the destination ESX host cluster.

The following discusses a specific embodiment for avoiding rollback according to the system described herein for failure conditions like that discussed above. In the event of an expected link failure or a condition that results in a determination that link failure between a source site and the destination site is more likely, at the moment that the host cluster (e.g., an SVT cluster) decides to start a VM migration to another site (e.g., which site may be the "winner" or preferred site in the event of a failure condition), it indicates this to the director cluster (e.g., a VPLEX cluster) at the source site by issuing an asynchronous cache synchronization command to the affected logical units of the director cluster at the source site. For an asynchronous command, the caller does not wait for the command to complete. The host cluster, either at the source site or as a distributed layer, may start pushing memory pages to the destination ESX host. The director cluster at the source site may start pushing storage data (e.g., in one or more data blocks) for the volume groups containing the affected logical units to the destination cluster.

Once the host cluster has pushed enough pages over to enable the host cluster to suspend the VM on the source ESX host, the host cluster may issue a synchronous cache synchronization command to the affected logical units of the director cluster at the source site. The host cluster then pushes the remaining memory pages to the destination ESX host, and the director cluster at the source site pushes the remaining storage data to the destination director cluster. Once the director cluster at the source site finishes, the director cluster then completes the second (synchronous) cache synchronization command. Once the host cluster sees that both the memory pages and the storage data are available to the destination ESX host, the host cluster resumes the VM on the destination host. If the director cluster somehow takes too long before it responds to the synchronous cache synchronization command (in other words it takes too long pushing the remaining storage data to the destination cluster), the VM can be resumed on the source ESX host and the process can be restarted at an appropriate one of the above-noted steps.

Therefore, in accordance with the system described herein, the above-noted embodiment provides for synchronizing data between a source and destination site during a migration operation by moving dirty data from a source site to a destination site along with a VM that was running at the source site and then resuming the operation of the VM on the destination site.

Although the system described herein is illustrated in connection with migrating virtual machines, it should be understood by one of ordinary skill in the art that the system may be extended to migrate applications other than VMs. Thus, the system is generally applicable to any appropriate unit, such as an application, that reads and writes data.

Figure 7:
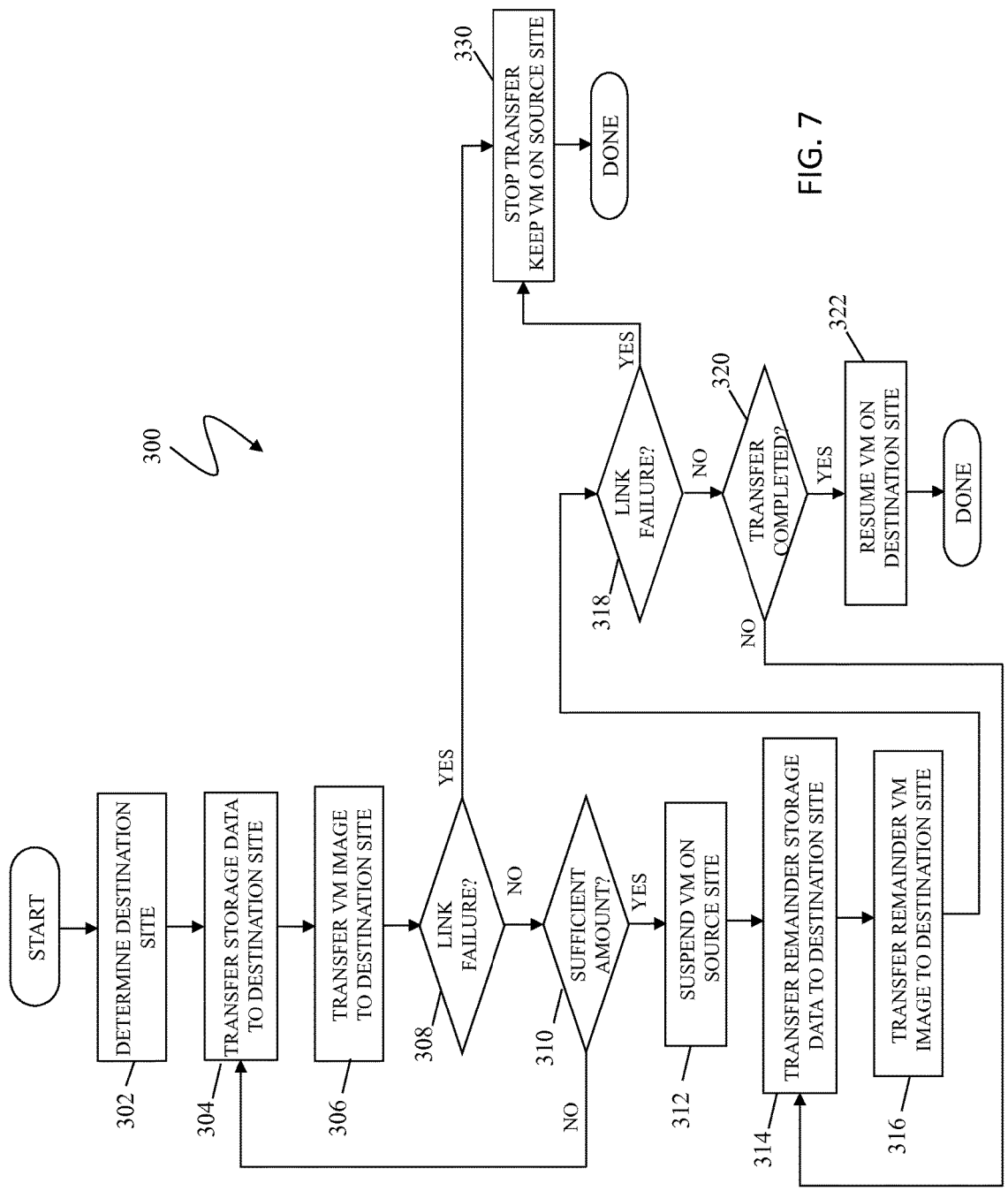
FIG. 7 is a flow diagram showing a method for providing mobility of a virtual machine between a first site and a second site of an active/active system according to an embodiment of the system described herein.

FIG. 7 is a flow diagram 300 showing a method for providing mobility of a VM between a source site, such as site A 201, and a destination site, such as site B 202, of an active/active system according to an embodiment of the system described herein. At a step 302, for a VM operating on the source site, a determination is performed to identify the destination site that may be, for example, a preferred site and/or a winner site. Determining the destination site may occur in response to a determination that at least one additional failure will result in a lack of resources to maintain desired operation of the VM on the source site. After the step 302, processing proceeds to a step 304 where, while the VM is operating on the source site, an amount of storage data is transferred from the source site to the destination site. After the step 304, processing proceeds to a step 306 where at least a portion of the VM image is transferred to the destination site. In various embodiments, the steps 304 and 306 may be performed in a different order than shown and/or may be performed concurrently.

After the step 306, processing may proceed to a test step 308 where it is determined if a link failure has occurred between the source site and the destination site. As further discussed elsewhere herein, failure conditions may be determined using a witness node, for example. If it is determined at the test step 308 that a link failure has occurred, then processing proceeds to a step 330 where the transfer processing to the destination site is stopped and the VM is to be kept at the source site. After the step 330, processing is complete.

If it is determined that a link failure has not occurred at the test step 308, then processing proceeds to another test step 310 where it is determined whether a sufficient amount of storage data and/or memory of the VM (VM image) has been transferred to the destination site. In various embodiments, a sufficient amount of storage data and/or VM image information may be determined according to one or more thresholds. For example, a threshold may be whether 90% of the storage data and/or the VM image has been transferred. In this way, since the VM continues to operate on the source site during this part of the process, changes to storage data and/or the VM image while the VM is operating in the source site may affect the determinations of the amount of current storage data and/or the VM image that has been transferred. The threshold may be configured to establish that at a particular point in time, given the amount of storage data and VM image information transferred, it is appropriate to proceed with processing to suspend and resume the VM on the destination site, as further discussed herein.

Accordingly, if, at the test step 310, it is determined that sufficient amounts of the storage data and/or VM image have not been transferred, then processing proceeds back to the step 304. Otherwise, if it is determined that a sufficient amount has been transferred at the test step 310 according to the threshold(s), then processing proceeds to a step 312 where operation of the VM is suspended on the source site. After the step 312, processing proceeds to a step 314 where a remainder amount of the storage data, that is remaining on the source site and that had not been transferred in the prior steps, is transferred from the source site to the destination site. After the step 314, processing proceeds to a step 316 where a remainder amount of the VM image information, that is remaining on the source site and that had not been transferred in the prior steps, is transferred from the source site to the destination site. Like that of steps 304 and 306, in various embodiments, the steps 314 and 316 may be performed in an order other than that shown and/or may be performed concurrently.

After the step 316, processing proceeds to a step 318 where it is again determined if a link failure has occurred between the source site and the destination site. If it is determined at the test step 318 that a link failure has occurred, then processing proceeds to the step 330 where the transfer processing to the destination site is stopped and the VM is to be kept at the source site. After the step 330, processing is complete.

If it is determined that a link failure has not occurred at the test step 318, then processing proceeds to another test step 320 where transfer of the storage data and VM image to the destination site is completed. That is, for example, completion of data and VM image transfer may be when 100% of the storage data and VM image have been transferred. If not, then processing proceeds back to the step 314. If the transfer to the destination site is determined to be completed at the test step 320, then processing proceeds to a step 322 where the VM is resumed on the destination site according to the transferred storage data and the transferred VM image. After the step 322, processing is complete.

In various embodiments, the above-noted processing may also include provisions for error processing in which it is determined that processing, such as transferring of storage data and/or the VM image, may not be performed and/or may not be desirable to perform. For example, a system may include mechanisms for factoring in load determination processing such that a determination that load on a network is high may cause cancellation of the VM transfer even where a link failure has not occurred. Similarly, the error processing may be performed in connection with exceeding a time threshold where an attempt to transfer storage data and/or the VM image has timed out over a network. It is also noted that the above-noted method, and other methods discussed herein, may be performed using executable code stored on a non-transitory computer readable medium that is executed by one or more processors and is performed in connection with a system having components like that further discussed elsewhere herein.

Another alternative embodiment of the system described herein is to make ESX hosts aware of the changed volume state by rebooting them so they pick up the current state. This assumes that ESX hosts do not forward information about their state to a centralized management software entity or other ESX hosts. All ESX hosts that may have state about volumes that have rolled back can be put in maintenance mode. The ESX host may not have to access the volume to store its updated state, because such access would risk corrupting the VMFS. By parking an ESX host in maintenance mode, all VMs that are not talking to the rolled back storage may be migrated to other ESX hosts. Once no VMs are remaining on the ESX host, it can be rebooted and pick up the new, rolled back state of the volume.

According to another embodiment of the system described herein, the system may control rollback of a volume, or portion thereof, in a different way. For example, the system may only rollback the state of the volume to a write order consistent image on the remote cluster. For example, a winning site may contain all local writes and only the remote writes that have been synchronized locally in a write order consistent way. This would result in a volume image that is not globally consistent, and it is noted that some applications may not be able to deal with this alternate rollback state.

According to another embodiment, the system described herein may provide for the use of the inter-cluster links between the host clusters (host networks 205) and the inter-cluster link between the director clusters (director networks 225) of multiple sites to be used to help migrate a VM. Such operation may be used to increase bandwidth of the host cluster enough that it is able to migrate over longer distances. Accordingly, instead, or in addition to, the transferring of a VM image using the host networks 205 and the storage data using the director networks 225, the host networks 205 may be used to transfer storage data and/or the director networks 225 may be used to transfer VM images. For example, in an embodiment, either the VM image and/or the storage data may be transferred over the director networks 225 between the director clusters in connection with a VM migration operation. In another embodiment, either the VM image and/or the storage data may be transferred over the host networks 205. It is further noted that in connection with this operation, a host cluster may perform writes of the VM's image to the source director cluster at the source site and corresponding reads to the destination director cluster at the destination site. The above-noted method may be performed in connection with a determination of a failure of an inter-cluster link, with at least a last remaining inter-cluster link in operation. That is, even though one inter-cluster link has failed, such as failure of host networks 205, migration of a VM may be advantageously enhanced by using the remaining inter-cluster link, such as director networks 225, to help with the migrating by increasing the bandwidth of the host cluster, and vice versa.

FIG. 8A is a flow diagram 400 showing a method for using the inter-cluster link (director networks 225) between director clusters 220*a,b* of multiple sites 201, 202 in an active/active system according to an embodiment of the system described herein. At a step 402, operation of a VM is initiated, or otherwise maintained, on a source site (e.g., site A 201). After the step 402, processing proceeds to a step 404 where at least some storage data is transferred to the destination site (e.g., site B 202) over the director networks 225. After the step 404, processing proceeds to a step 406 where at least a portion of a VM image is transferred to the destination site over the director networks 225. In this embodiment, the portion of the VM image may be transferred over the director networks to a shared memory (e.g. cache) location on the destination site. After the step 406, processing proceeds to a step 408 where a read of the VM image that was transferred to the destination site is received at the host cluster of the source site. After the step 408, processing proceeds to a step 410 where a director of the source site fetches the VM image from the shared memory location on the destination site over the director networks 225 to service the read request. Accordingly, in this embodiment the VM image and storage data may be transferred from a source site to a destination site using the director networks 225. It is further noted that the order of various steps described above may be different than that shown and/or may be performed concurrently. After the step 410, processing is complete.

FIG. 8B is a flow diagram 450 showing a method for using the inter-cluster link (host networks 205) between host clusters 210*a,b* of multiple sites 201, 202 in an active/active system according to an embodiment of the system described herein. At a step 452, operation of a VM is initiated, or otherwise maintained, on a source site (e.g., site A 201). After the step 452, processing proceeds to a step 454 where at least a portion of the VM image is transferred to the destination site (e.g., site B 202) over the host networks 205. After the step 454, processing proceeds to a step 456 where at least some storage data (dirty data) is read by a host at the source site (e.g., site A 201). After the step 456, processing proceeds to a step 458 where the host at the source site sends the storage data to the destination site over the host networks 205. After the step 458, processing proceeds to a step 460 where a host at the destination site writes the storage data to the destination site. Accordingly, in this embodiment the VM image and storage data may be transferred from a source site to a destination site using the host networks 205. It is further noted that the order of various steps described above may be different than that shown and/or may be performed concurrently. After the step 460, processing is complete.

In various embodiments, the processing of FIGS. 8A and 8B may be performed in various combinations with each other. That is, the VM image and storage data may be transferred from a source site to a destination site using the host networks 205 and the director networks 225 in any appropriate combination. For example, embodiments of the system described herein may be performed in combination with normal operations using the host networks 205 and the director networks 225, that is, in which storage data is transferred over the director networks 225 (see, e.g., step 402 of FIG. 8A) and/or a VM image is transferred over the host networks 205 (see, e.g., step 452 of FIG. 8B), along with the use of the director networks 225 to transfer VM images and the use of the host networks 205 to transfer storage data.

When the inter-cluster storage network fails, the symmetric view of the data blocks may no longer be maintained over the inter-cluster storage network. Generally, storage systems stop exporting a disk image on a site that has failed. At this point, the inter-cluster computer network may still be available and may be utilized to synchronize the storage to the winning site in accordance with the system described herein. This may be done in two ways: (1) pushing disk block ownership (i.e., responsibility) and data from losing site to winning site and/or (2) pulling disk block ownership and data from losing site to winning site.

FIG. 9 is a flow diagram 500 showing a method of pushing data block ownership and data from losing site to winning site in the event of a director network failure according to an embodiment of the system described herein, and in which alternate networks, such as the host networks, may be used. At a step 502, an application is started on one of the computers to transfer ownership of data blocks to the winning site. After the step 502, processing proceeds to a step 504 where the application queries the losing site for ownership of clean and dirty data blocks. After the step 504, processing proceeds to a step 506 where the ownership of the clean data blocks is transferred to the winning site from the losing site. After the step 506, processing proceeds to a step 508 where the dirty data blocks and the ownership of those blocks is transferred from the losing site to the winning site. In an embodiment, the ownership of dirty data blocks may only be transferred to the winning site after the dirty blocks are synchronized to the winning site, thereby allowing the winning site director cluster to serve incoming I/Os for those blocks. It is noted that the above-noted processing may be done in-band and out-of-band. After the step 508, processing is complete.

Figure 10:
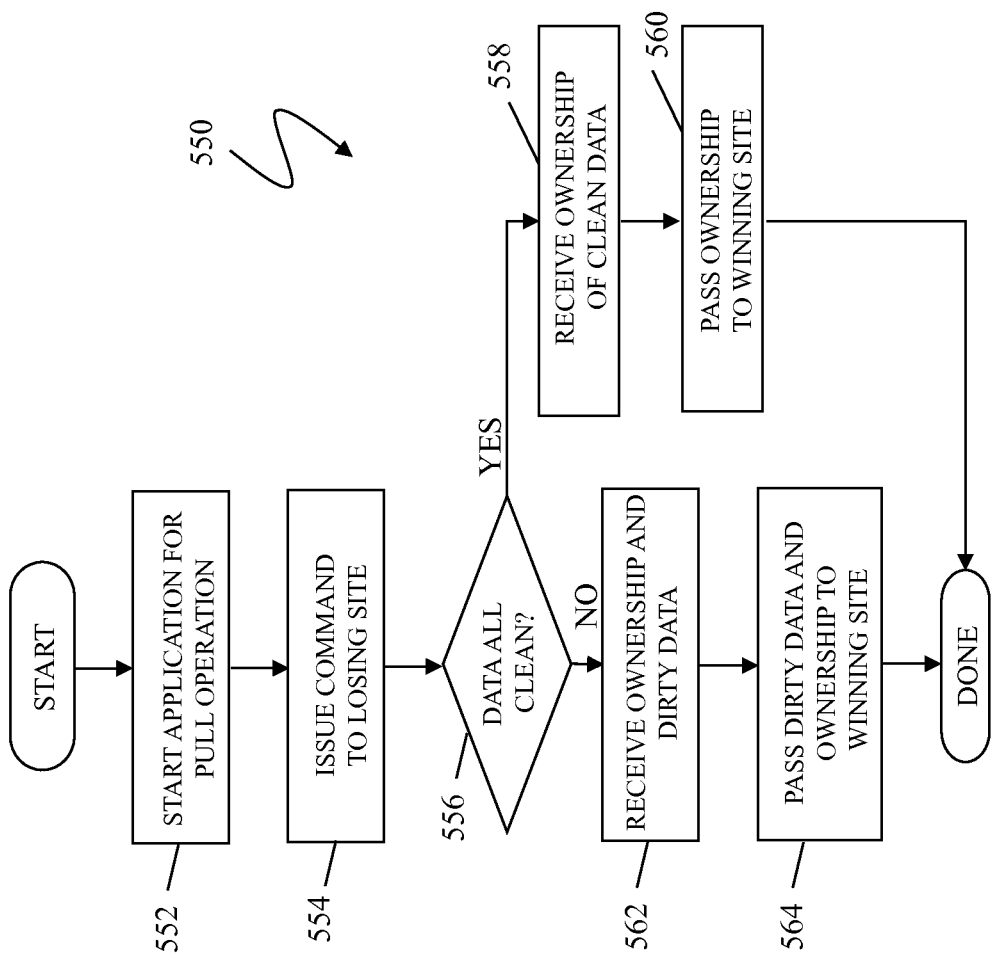
FIG. 10 is a flow diagram showing a method of pulling data block ownership and data from the losing site to the winning site according to an embodiment of the system described herein.

FIG. 10 is a flow diagram 550 showing a method of pulling data block ownership and data from the losing site to the winning site according to an embodiment of the system described herein. Reads and writes to the winning site may pull ownership and dirty data blocks from the losing site on an as-needed basis. At a step 552, an application is started on one of the computers to transfer ownership and dirty data blocks to the winning site when needed. At a step 554, the application issues a command to the losing site that requests ownership of data blocks and dirty data that are the subject of the command. In an embodiment, the command may be issued in connection with transmission of an error code. After the step 554, processing proceeds to a test step 556 where it is determined whether the requested data blocks are all clean data. If all the requested blocks are all clean data blocks, then processing proceeds to a step 558 where the application only receives the ownership of the data blocks. After the step 558, processing proceeds to a step 560 where the application passes the ownership of the data blocks to the winning site. The winning site can provide the clean data blocks after receiving the ownership. After the step 560, processing is complete. If, at the test step 556, it is determined that at least some of the requested blocks are dirty, then processing proceeds to a step 562 where the application receives the dirty blocks and the ownership. After the step 562, processing proceeds to a step 564 where the dirty blocks and the ownership are passed to the winning site. After the winning site receives the ownership, it can start serving I/Os for these blocks and no longer needs to pass an error code back. After the step 564, processing is complete.

A combination of the methods of pushing and pulling disk storage data and ownership is also possible according to various embodiments of the system described herein. For example, the combination of pushing the storage block ownership of clean blocks and pulling the block ownership and data of dirty blocks may be desirable.

According further to the system described herein, when the last redundant resource of a cluster level vulnerability fails, one of the clusters will no longer serve I/O, either because the cluster failed or because cache coherence can no longer be guaranteed between the clusters. If all VMs made it in time to safety on the less vulnerable or preferred site that is still serving I/O as set forth herein, then the system may continue operating in the manner provided. If not, however, three further options may be provided according to various embodiments of the system described herein:

1. All VMs may be restarted from a Write Order Fidelity (WOF) consistent virtual volume (e.g., from a couple of seconds ago). Due to the restart, the VMs may boot from an initial memory state.

2. All VMs may be restarted with an application consistent snapshot of the virtual volume. Periodic snapshot of the virtual volume may be created to facilitate this approach.

3. All VMs may be resumed with a memory state and virtual volume state from a coordinated VM/disk snapshot. Periodic coordinated snapshots of both VM (with memory state) and virtual volume may be created to facilitate this approach.

In case 1, all applications running in VMs should be able to detect what work is lost by studying the current state of the disk and carry on from that point. In case 2, all applications running in VMs may simply carry on without having to check the state of the disk. In cases 2 and 3, all applications running in VMs may redo the work from the moment that the snapshots were taken. Note that external transactions to the VMs that occurred since the snapshot may be lost.

Figure 11:
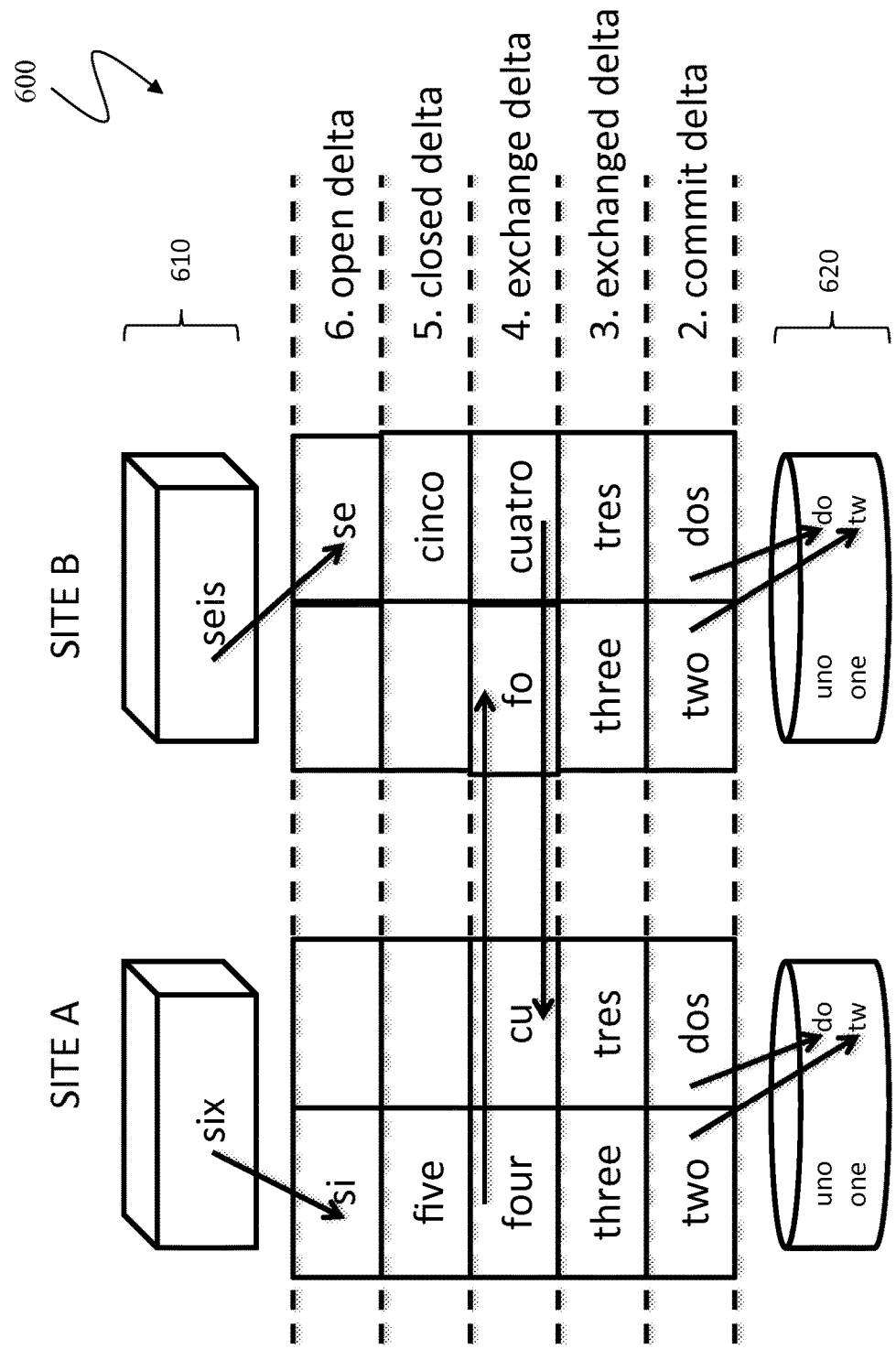
FIG. 11 is a schematic illustration of a write order fidelity (WOF) pipeline and visualizes some details that may be used according to an embodiment of the system described herein.

FIG. 11 is a schematic illustration of a write order fidelity (WOF) pipeline 600 and visualizes some details that may be used according to an embodiment of the system described herein. Write order consistency may be achieved by grouping writes in delta sets ("deltas") and providing consistency on a delta boundary basis. Further details of WOF may be found in U.S. Pat. No. 7,475,207 to Bromling et al., which is referenced elsewhere herein. The WOF pipeline may include multiple deltas. Deltas may have ids that are monotonically increasing, where older deltas have lower numbers. The figure shows deltas 2 through 6. The contents of delta 1 made it to the distributed volume as can be seen by "one" and "uno" being present on the disks 620. The director cluster may have an open delta with id 6. Hosts 610 in each site are writing "six" on Site A, and "seis" on Site B to the open delta. At some point the open delta closes indicating that no new writes are accepted while outstanding writes are finishing their data phase. The closing of the delta may be coordinated between all directors in both clusters. Once the last write for the closing delta is finished the closing delta is closed and a new delta (with id 7) is opened and new writes will be accepted into the new delta. The blocks in closed deltas may be exchanged at a later time. In the figure, delta 4 is in the exchange phase as can be seen by "four" being exchanged to Site B and "cuatro" being exchanged to Site A. Once a delta is fully exchanged, the next available closed delta is exchanged. Sometime later, exchanged deltas are committed to disk. In the figure, the delta with id 2 is committing, as can be seen by both sites writing "two" and "dos" to their local leg of the distributed volume. Note that both legs of the distributed volume may be substantially identical (modulo currently committing deltas) even though some writes were initiated by hosts at Site A and others by hosts at Site B.

Figure 12:
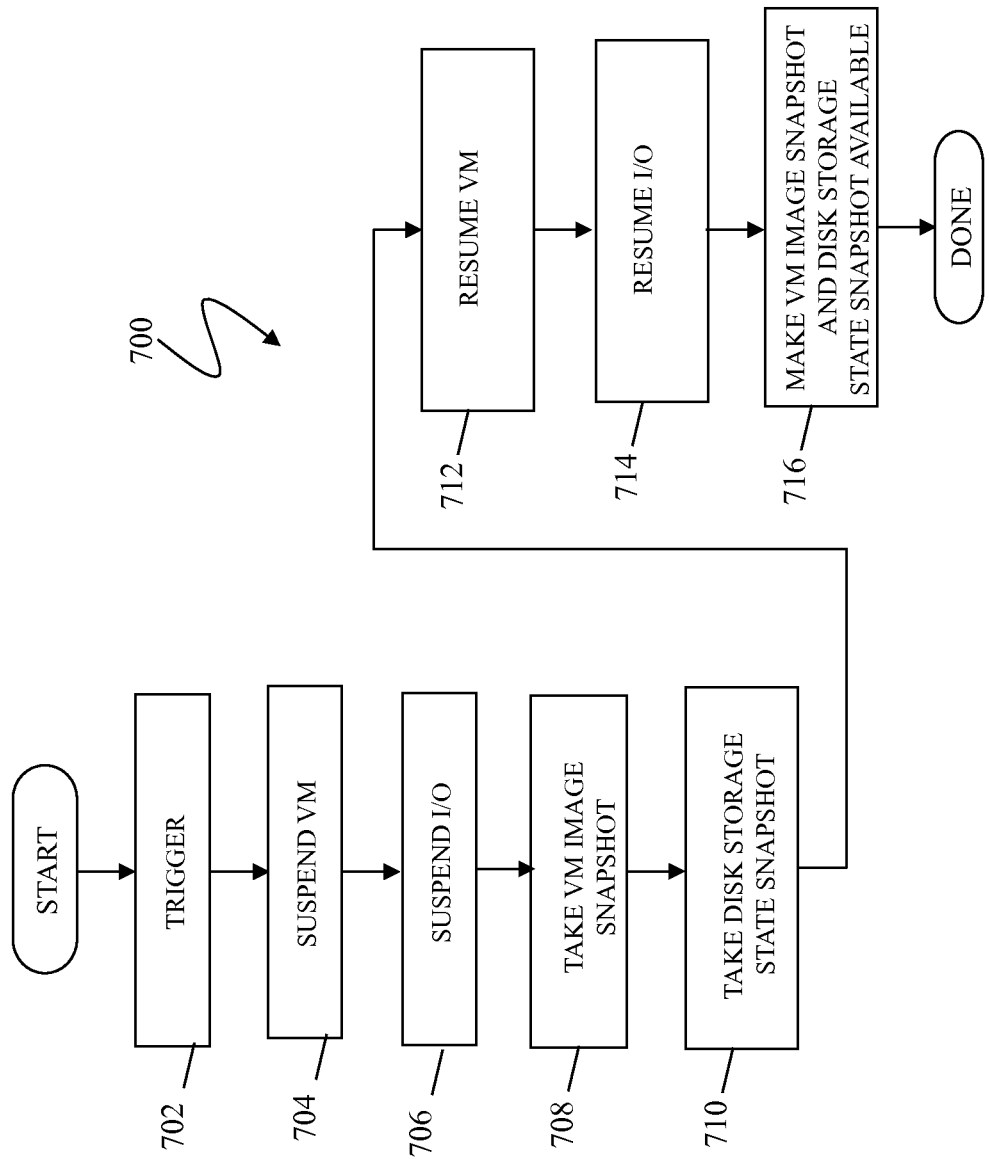
FIG. 12 is a flow diagram showing a method for taking and using synchronized snapshots of the memory state (image) of a VM and the storage state of a disk to provide a fail-over mechanism for high availability.

FIG. 12 is a flow diagram 700 showing a method for taking and using synchronized snapshots of the memory state (image) of a VM and the storage state of a disk to provide a fail-over mechanism for high availability. At a step 702, a determination is made to trigger the taking and using of a synchronized VM image snapshot and storage state snapshot of a disk. For example, in an embodiment, the triggering determination may be made following a failure condition in which one additional failure may result in insufficient resources for operation of the VM on an active/active system, as further discussed elsewhere herein. In another embodiment, the triggering for taking the VM image snapshot and storage state snapshot may be caused by a user. After the step 702, processing proceeds to a step 704 where the VM is suspended such that a snapshot image of the VM may be obtained. After the step 704, processing proceeds to a step 706 where I/O processing is suspended such that a storage state snapshot may be obtained. Various techniques may be used in connection with suspending I/O processing. It is noted that steps 704 and 706 may be reversed, as appropriate, and performed in parallel.

After the step 706, processing proceeds to a step 708 where a snapshot image of the VM is taken when the VM is preparing to commit a write of a delta to a bucket in accordance with WOF pipeline processing as further discussed elsewhere herein. After the step 708, processing proceeds to a step 710 where a snapshot is taken of the storage state of a disk being utilized to store data in connection with the WOF transfer processing. The VM image snapshot and the storage state snapshots are synchronized and it is noted that the order of steps 708 and 710 may be reversed, as appropriate, and/or may be performed in parallel. After the step 710, processing proceeds to a step 712 where the VM is resumed. After the step 712, processing proceeds to a step 714 where I/O processing is resumed. It is noted that the steps 712 and 714 may be reversed, as appropriate, or performed in parallel. After the step 714, processing proceeds to a step 716 where the VM image snapshot and storage state snapshot are made available for subsequent access as further discussed elsewhere herein. After the step 716, processing is complete.

Figure 13:
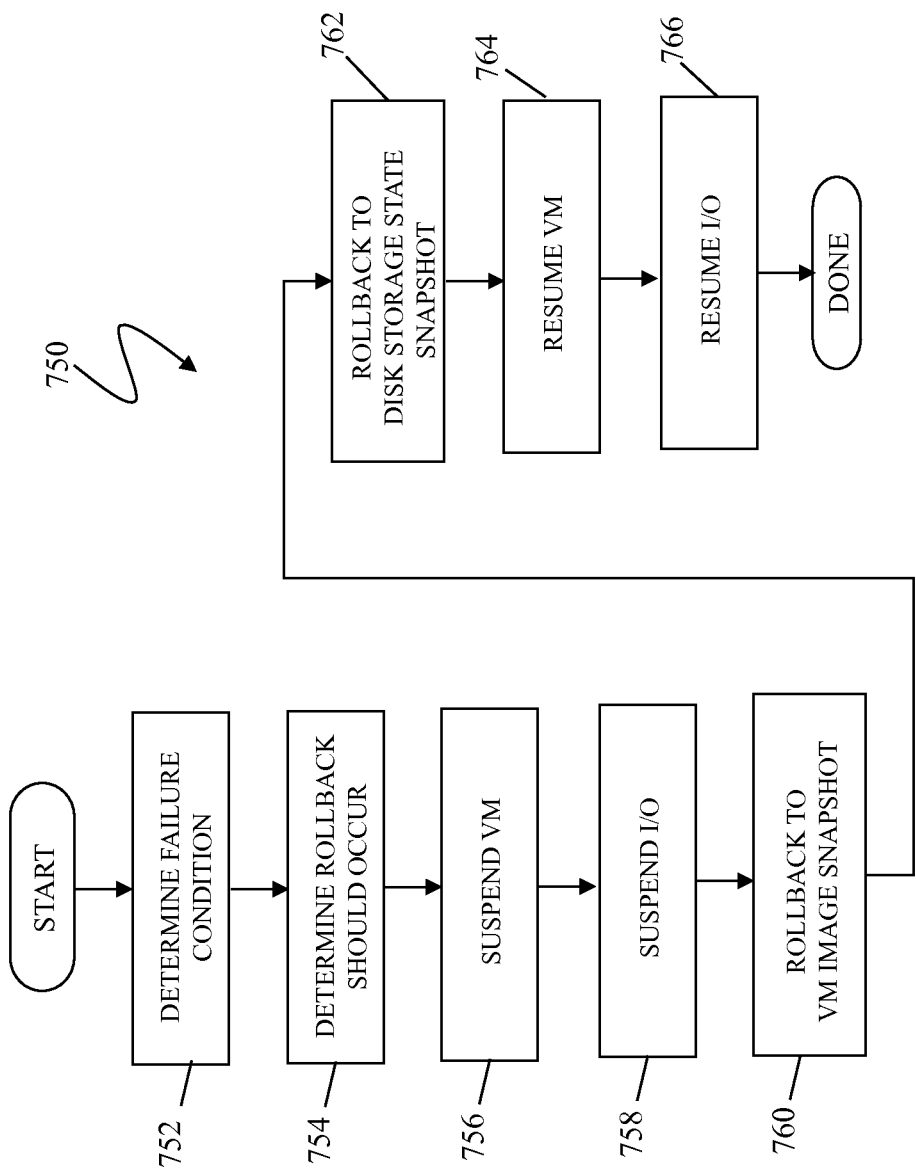
FIG. 13 is a flow diagram showing processing following a failure in the active/active system according to an embodiment of the system described herein.

FIG. 13 is a flow diagram 750 showing processing following a failure in the active/active system according to an embodiment of the system described herein. At a step 752, a determination is made that a failure has occurred in the active/active system, such as a link failure between multiple sites. After the step 752, processing proceeds to a step 754 where a rollback determination is made to rollback the state of a VM and disk array to a prior state. After the step 754, processing proceeds to a step 756 where the VM is suspended. After the step 756, processing proceeds to a step 758 where I/O processing is suspended. In various embodiments, the order of steps 756 and 758 may be reversed, as appropriate, and/or performed in parallel. After the step 758, processing proceeds to a step 760, where the VM is rolled back to a prior state of operation in connection with the VM image snapshot. After the step 760, processing proceeds to a step 762 where disk array is rolled back a prior storage state. Specifically, the VM and storage state of the disk may be rolled back to a state corresponding to the snapshots taken in connection with the flow diagram 700. In this way, a VM and disk state may be advantageously rolled back to an incremental delta state that avoids data loss by using one or more of the incremental delta snapshots taken during the WOF processing in connection with the committing of write deltas to buckets according to the system described herein. The incremental delta snapshot used for the rollback may correspond to a time just prior to the failure that triggered the rollback. It is noted that steps 760 and 762 may be performed in a different order than that shown and/or may be performed concurrently.

After the step 762, processing proceeds to a step 764 where the VM is resumed according to the rollback state snapshots. After the step 764, processing proceeds to a step 766 where I/O processing is resumed. In various embodiments, the order of steps 764 and 766 may be reversed, as appropriate, and/or performed in parallel. After the step 764, processing is complete.

In some cases, it may be desirable to migrate a VM from a source site to a destination site in a manner that does not result in any appreciable down time for the VM. Thus, the mechanism discussed above in connection with the flow chart 300 of FIG. 7 may not provide desired performance if there is too much time between the step 312, where the VM on the source site is suspended, and the step 322, where the VM on the destination site is resumed. This may occur if there is a significant amount of data that needs to be transferred at the step 314. Of course, this amount may be controlled somewhat by reducing the limit at the step 310. However, for a relatively active VM, it may not be possible to reduce the limit too far since the differences between data at the source and destination may accumulate between the step 304 (when the data is transferred) and the step 312, when the source VM is suspended. An alternative embodiment overcomes this by using a different mechanism to transfer the VM and corresponding data from a source site to a destination site. This is explained in more detail elsewhere herein.

FIG. 14 is a flow diagram 800 showing a method for providing mobility of a VM between a source site and a destination site of an active/active system according to an embodiment of the system described herein. Processing illustrated by the flow diagram 800 is similar to that described elsewhere herein in connection with the flow diagram 300 of FIG. 7, except that, as discussed in more detail below, the processing illustrated by the flow diagram 800 minimizes an amount of time between suspending a VM on the source site and resuming the VM on the destination site.

At a step 802, for a VM operating on the source site, a determination is performed to identify the destination site that may be, for example, a preferred site and/or a winner site. Determining the destination site may occur in response to a determination that at least one additional failure will result in a lack of resources to maintain desired operation of the VM on the source site. Of course, the determination to move the VM to a particular destination site can be for any reason and use any appropriate criteria. The destination site may be selected by a user. After the step 802, processing proceeds to a step 804 where the system is set so that any subsequent writes by the VM at the source site are performed synchronously. Writing data synchronously is described in more detail elsewhere herein.

Following the step 804 is a step 806 where, while the VM is operating on the source site, a cache synchronization operation (described elsewhere herein) is performed to begin transferring storage data from the source site to the destination site. The cache synchronization operation copies modified data (dirty data) from the source site to the destination site. Following the step 806, processing proceeds to a test step 808 where it is determined if the cache synchronization operation has completed so that all of storage data has been transferred from the source site to the destination site. Note that, as discussed in more detail elsewhere herein, causing subsequent writes to provide synchronous transfer at the step 804 results in there being no additional dirty data in the cache of the source site.

If it is determined at the test step 808 that the cache synchronization operation has not completed, then control transfers back to the step 808 to continue to poll. Otherwise, if it is determined at the test step 808 that the cache synchronization operation has completed, then processing proceeds to a step 812 where operation of the VM is suspended on the source site. After the step 812, processing proceeds to a step 814 where the VM is resumed on the destination site according to the transferred storage data. After the step 814, processing is complete. Note that, in some embodiments, the VM image may also be transferred from the source site to the destination site while, in other embodiments, the VM image and associated state information may be considered part of the data that is transferred at the step 806 (synchronize cache) and is written synchronously following execution of the step 804.

Referring to FIG. 15, a flow diagram 830 illustrates steps performed in connection with write operations performed by the VM at the source site following execution of the step 804 of FIG. 14, described above, where subsequent writes by the VM at the source site are performed synchronously. For synchronous writes at the source site, any data written by the VM at the source site is first copied to the destination site before the VM receives a write acknowledge.

Processing for the flow diagram 830 begins at the test step 832 where it is determined if the data being written by the VM at the source site corresponds to dirty data in the cache of the source site. The test at the step 832 determines if the data being written for a particular data unit (e.g., track, block, etc.) corresponds to the same particular data unit provided in the cache of the source site awaiting transfer to the destination site. If not, then control transfers from the test step 832 to a step 834 where the data is propagated (sent) to the destination site. Following the step 834 is a step 836 where the system waits for the destination site to acknowledge propagation of the data thereto. Following the step 836 is a step 838 where the write is acknowledged to the VM at the source site. Following the step 838, processing is complete. Note that the VM at the source site does not receive an acknowledgement of the write until the data has been successfully propagated to the destination site.

If it is determined at the test step 832 that the data being written for a particular data unit (e.g., track, block, etc.) corresponds to the same particular data unit provided in the cache of the source site awaiting transfer to the destination site, then control transfers from the test step 832 to a step 842 where the data being written is combined with the data in the cache. For example, if the data being written corresponds to a few bytes of a particular block, then the block is fetched from the cache at the source site and the data is written to the data fetched from the cache. Following the step 842 is a step 844 where the data is cleared from the cache (because it is going to be subsequently transferred). Note that the data being cleared at the step 844 had already been combined with the data being written at the step 842. Following the step 844 is the step 834, discussed above, where the data is transferred to the destination site.

Figure 16A:
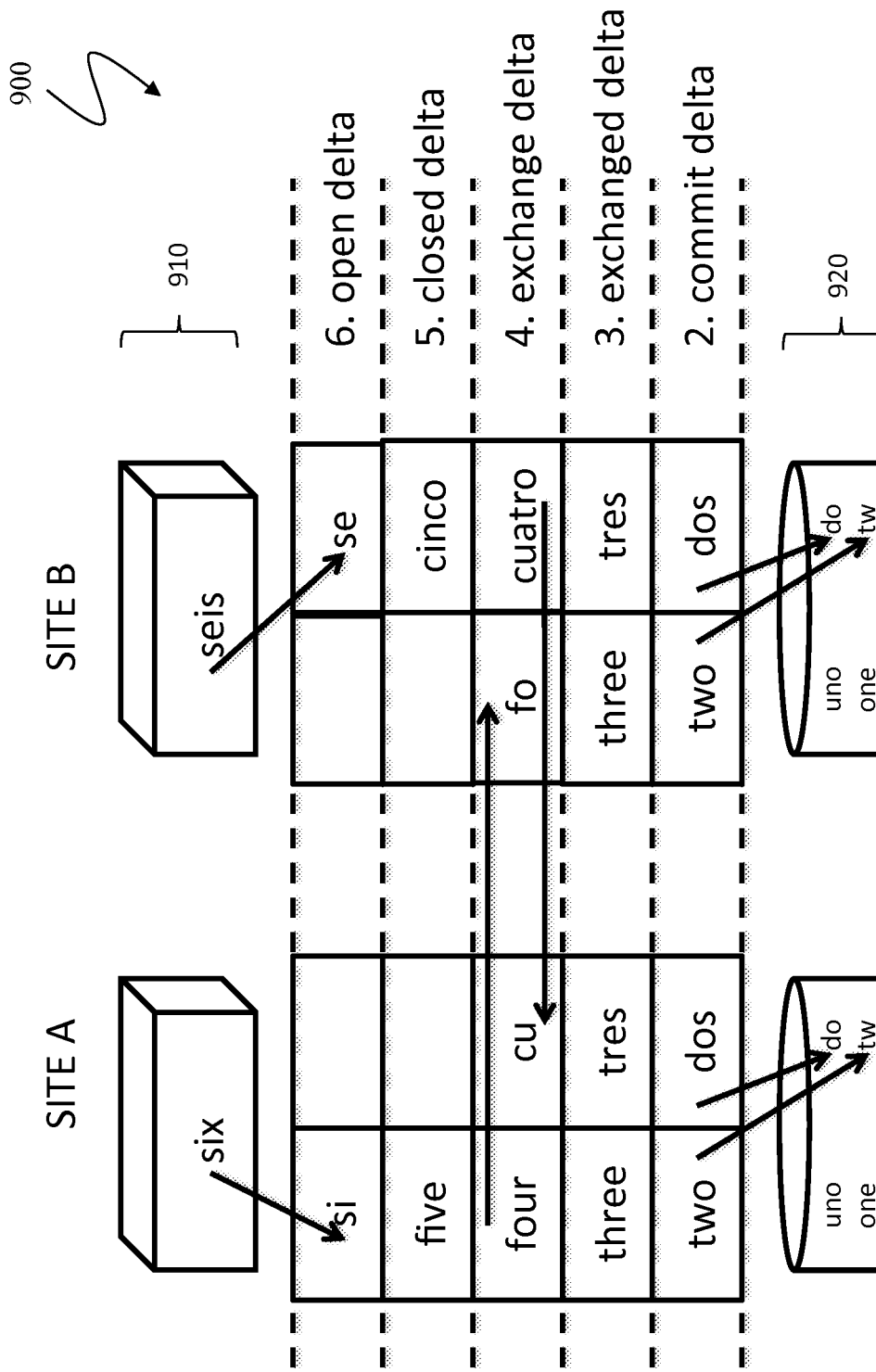
FIGS. 16A-16E illustrate transition of a write order fidelity (WOF) pipeline from asynchronous transfer mode to a semi-synchronous transfer mode according to an embodiment of the system described herein.

FIGS. 16A-16E illustrate transition of a write order fidelity (WOF) pipeline 900 to a semi-synchronous mode according to an embodiment of the system described herein where data written by hosts at each of the sites 910 is transferred as soon as possible to another one of the sites 910. As with FIG. 11, discussed above, write order consistency may be achieved by grouping writes in delta sets ("deltas") and providing consistency on a delta boundary basis. The contents of a commit delta is provided to a distributed volume as can be seen by "one" and "uno" being present on the disks 920 in both participating sites. FIG. 16A shows that a director cluster may have an open delta where hosts are writing "six" on Site A, and "seis" on Site B to the open delta. Operation of the system as illustrated by FIG. 16A is similar to that described above in connection with FIG. 11.

Figure 16B:
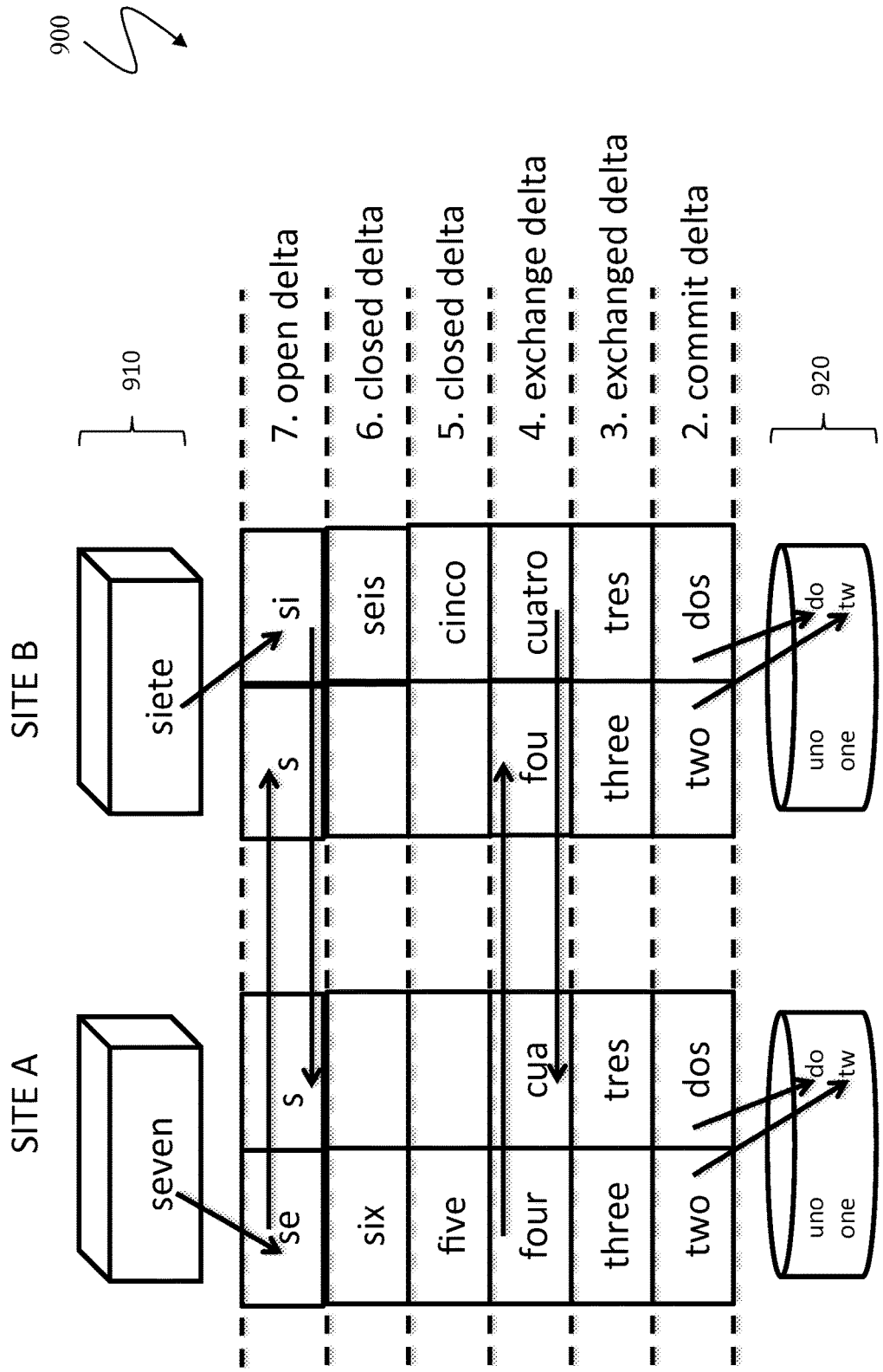
Figure 16C:
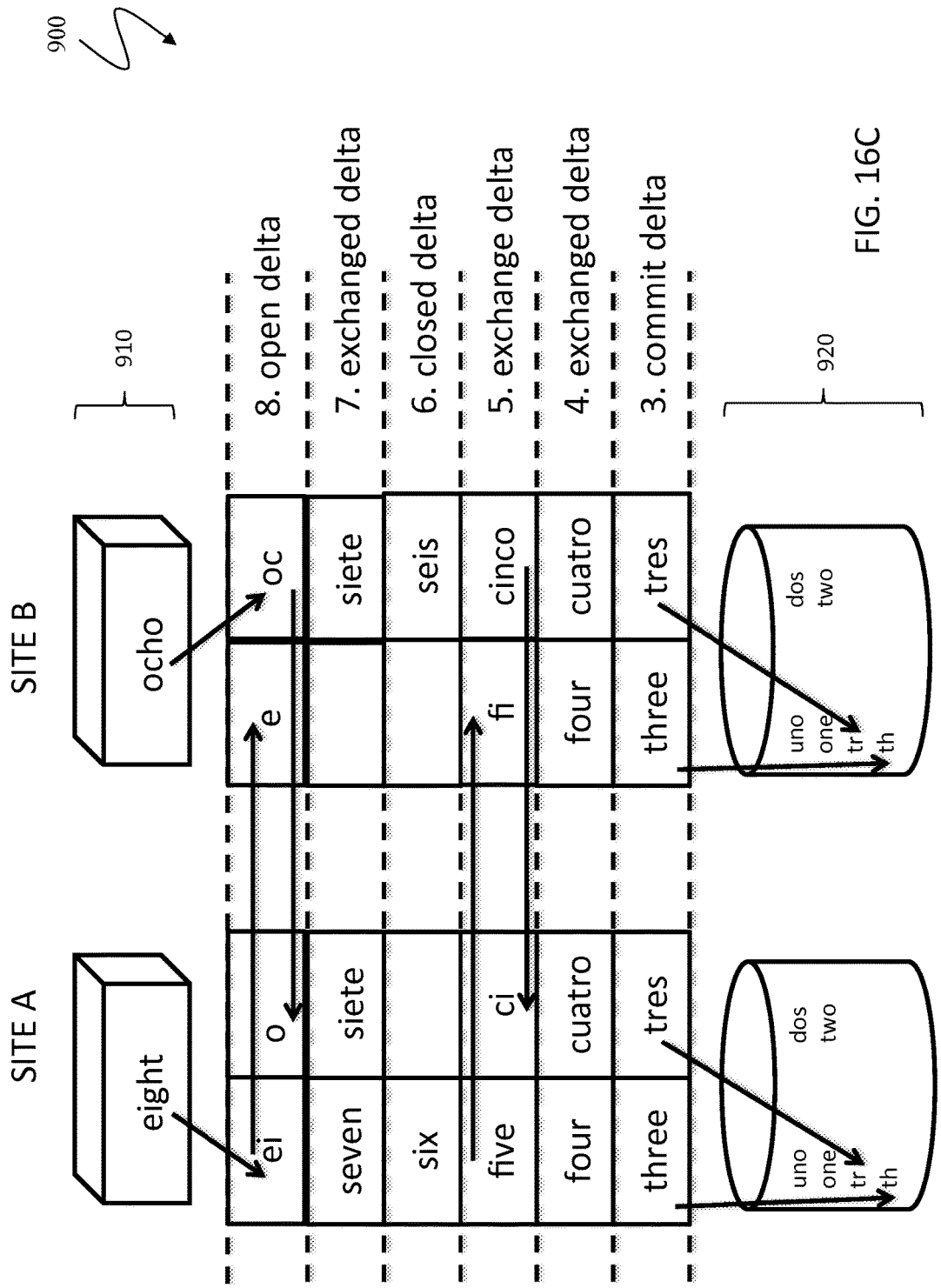
Figure 16D:
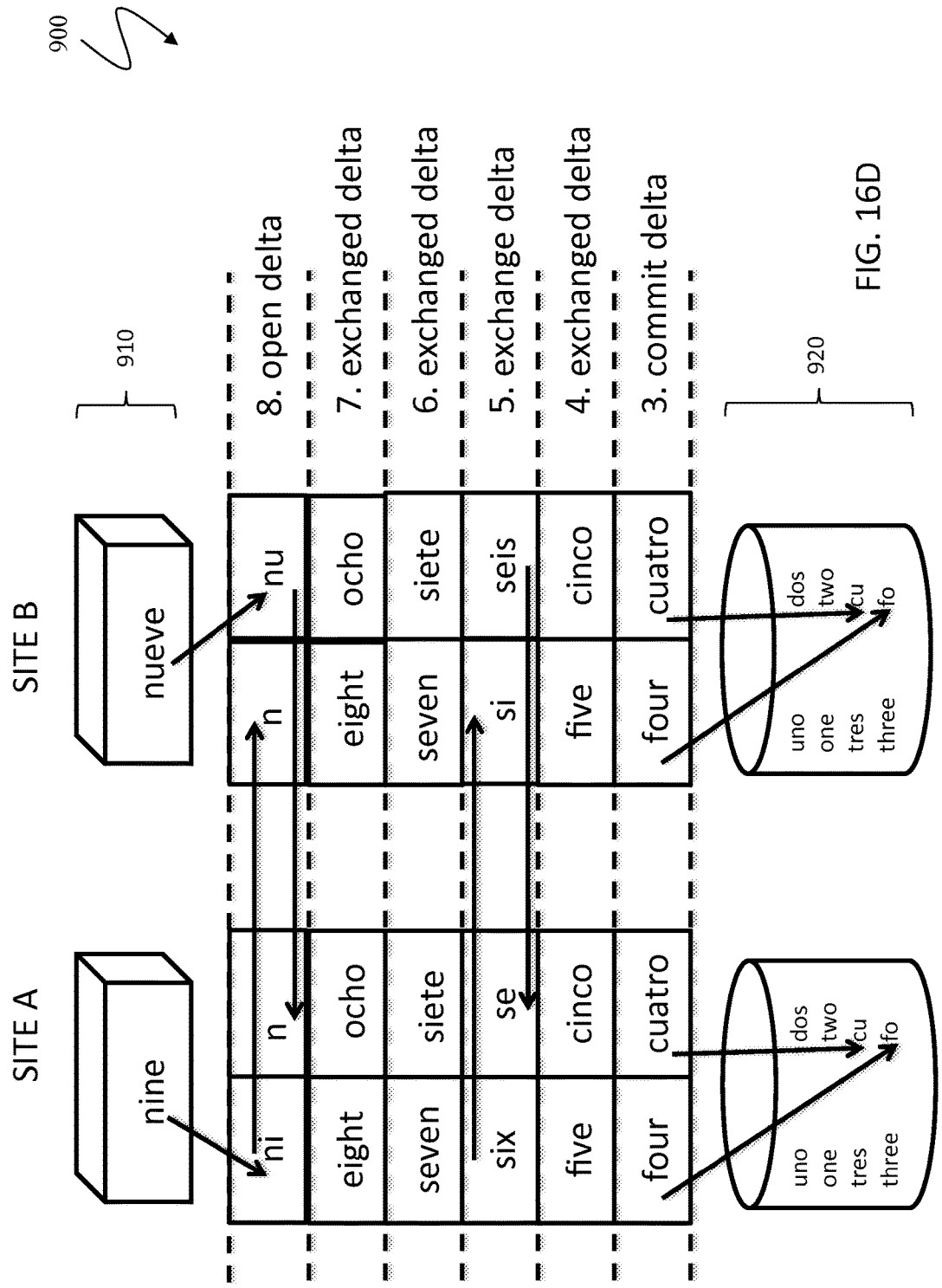
Figure 16E:
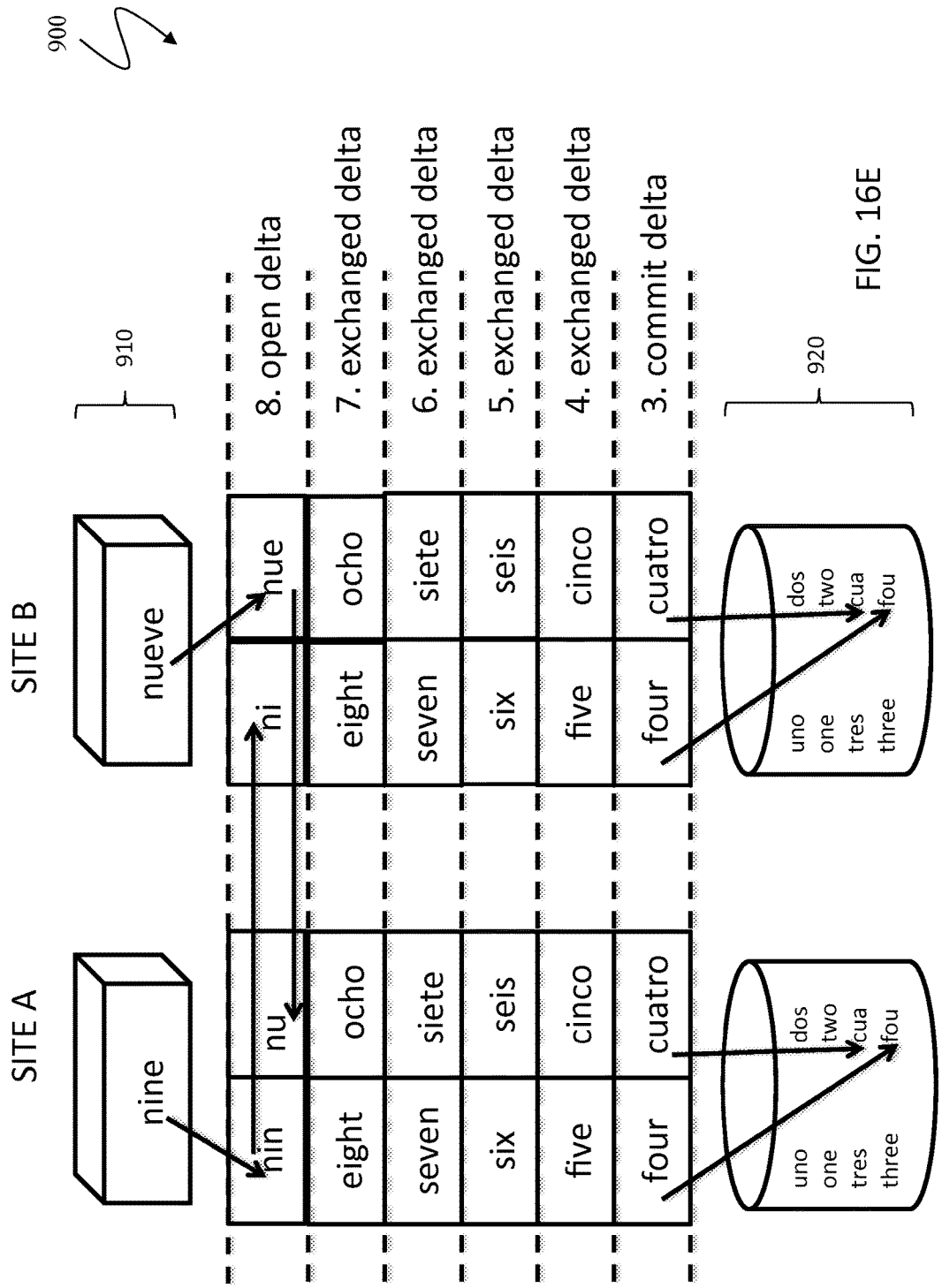

In FIG. 16B, the system begins a transition into semi-synchronous mode by immediately transferring data associated with newly incoming writes to the same open delta in all the participating sites 910. FIG. 16C shows that the previously open delta from FIG. 16B becomes a closed or exchanged delta depending on whether its data has been exchanged between the sites 910. FIG. 16D shows that the previously closed delta, which was generated prior to the start of the transition, has become an exchange delta. FIG. 16E shows completion of the transition to semi-synchronous mode, where the open delta exchanges data between the sites 910 and the remaining deltas are either exchanged deltas or the commit delta where data is written to the volumes. Note that, after the completion of the transition to semi-synchronous mode, all closed deltas are implicitly exchanged.

Note that, a transition from an asynchronous transfer mode to a synchronous transfer mode causes the system to wait while the entire WOF pipeline is flushed (destaged). On the other hand, there is no similar wait for a transition to semi-synchronous mode, where data written to one site is transferred to the other site from the same open delta that is accepting writes. The system continues to accept writes during the transition to semi-synchronous mode.

Note that semi-synchronous mode can be applied on a per site pair basis but also on a per direction basis. FIG. 16A-16E show semi-synchronous mode being applied in both directions of a site pair. For example, a primary site (one that has all the up-to-date write data) can be created if all other sites write their data synchronously or semi-synchronously to the primary site. Note that writes on a primary cluster can still be written asynchronously to non-primary sites that participate in a distributed RAID-1 scheme. It is also possible to have two primary sites (for example the source and destination site for a migration) out of multiple sites be the only participants in a transition to synchronous or semi-synchronous mode. In such a case, all sites may copy data synchronously or semi-synchronously to both primary sites.

In some embodiments, during a transition from asynchronous mode to synchronous mode the system may continue accepting I/O, but the transition may now take an indefinite amount of time without further improvements. To guarantee a finite amount for this transition, the storage system may employ throttling of the incoming writes to a throughput level lower than the exchange throughput level. The transition from asynchronous mode to synchronous mode with either suspension of I/O or continued asynchronous handling of I/O may result in I/Os that take longer than the host I/O timeout. Hence, the preferred transition is the one to semi-synchronous mode.

In another embodiment, the system can transition from asynchronous mode to synchronous mode via the semi-synchronous mode. This has the same continuous I/O advantage that the transition to semi-synchronous provides. Given that all data is already exchanged in the semi-synchronous mode, the transition from semi-synchronous to synchronous should be fast.

Note that the system illustrated herein (e.g., the system illustrated in connection with FIG. 14 and FIG. 15) may be expanded to operate on an application other than a VM. Thus, the discussion herein that references a VM and storage therefore at the source site and destination site is applicable to any application and storage therefor that may be migrated from a source site to a destination site. Also note that the system described in connection with FIG. 14 may generally operate asynchronously, and thus avoid unacceptable delays associated with synchronous writes for geographically distant sites, but then switch to synchronous mode or semi-synchronous mode when a VM (or possibly other application) is being transferred from a source site to a destination site. Thus, the system described herein takes advantage of the desirable characteristics of both synchronous systems and asynchronous systems.

In various embodiments, the above-noted processing may also include provisions for error processing in which it is determined that processing, such as transferring of storage data and/or the VM image, may not be performed and/or may not be desirable to perform. For example, a system may include mechanisms for factoring in load determination processing such that a determination that load on a network is high may cause cancellation of the VM transfer even where a link failure has not occurred. Similarly, the error processing may be performed in connection with exceeding a time threshold where an attempt to transfer storage data and/or the VM image has timed out over a network. It is also noted that the above-noted method, and other methods discussed herein, may be performed using executable code stored on a non-transitory computer readable medium that is executed by one or more processors and is performed in connection with a system having components like that further discussed elsewhere herein.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transferring an application from a first site to a second site, comprising:
   transitioning into a semi-synchronous mode by grouping writes by the application into delta sets to provide write order consistency, a first delta set being closed to finish pending writes by the application thereto and a second, different, delta set being opened and accepting new writes from the application after closing the first delta set and after a last one of the writes completes to the first delta set;
   propagating writes by the application at the first site to the second site, wherein, during the transitioning into the semi-synchronous mode, data written by the application at the first site to the first delta set is subsequently transferred to the second site while the first site is accepting the writes by the application to the second delta set;
   synchronizing cache data for the application between the first site and the second site by copying modified data from the first site to the second site, wherein the modified data is separate from data provided in the delta sets and wherein propagating writes by the application at the first site to the second site results in the cache data remaining unchanged;
   suspending operation of the application on the first site following completion of synchronizing cache data; and
   resuming operation of the application on the second site.

2. The method according to claim 1, wherein the application is a virtual machine.

3. The method according to claim 2, wherein the virtual machine is transferred from the first site to the second site by transferring an image of the virtual machine from the first site to the second site.

4. The method according to claim 1, wherein the second site is selected by a user.

5. The method according to claim 1, wherein each of the first site and second site include at least one host cluster, at least one director cluster and at least one storage array.

6. The method according to claim 1, wherein the second site is located remotely from the first site across an asynchronous distance.

7. The method according to claim 1, further comprising:
   combining data from a cache at the first site with data being written by the application at the first site in response to writing application data when the cache at the first site contains data awaiting transfer to the second site and the data from the cache corresponds to the application data.

8. A non-transitory computer-readable medium containing software that transfers an application from a first site to a second site, the software comprising:
   executable code that controls transitioning into a semi-synchronous mode by grouping writes by the application into delta sets to provide write order consistency, a first delta set being closed to finish pending writes by the application thereto and a second, different, delta set being opened and accepting new writes from the application after closing the first delta set and after a last one of the writes completes to the first delta set;
   executable code that propogates writes by the application at the first site to the second site and wherein, during the transitioning into the semi-synchronous mode, data written by the application at the first site to the first delta set is subsequently transferred to the second site while the first site is accepting the writes by the application to the second delta set;
   executable code that synchronizes cache data for the application between the first site and the second site by copying modified data from the first site to the second site, wherein the modified data is separate from data provided in the delta sets and wherein propagating writes by the application at the first site to the second site results in the cache data remaining unchanged;
   executable code that suspends operation of the application on the first site following completion of synchronizing cache data; and executable code that resumes operation of the application on the second site.

9. The non-transitory computer-readable medium according to claim 8, wherein the application is a virtual machine.

10. The non-transitory computer-readable medium according to claim 9, wherein the virtual machine is transferred from the first site to the second site by transferring an image of the virtual machine from the first site to the second site.

11. The non-transitory computer-readable medium according to claim 8, wherein the second site is selected by a user.

12. The non-transitory computer-readable medium according to claim 8, wherein each of the first site and second site include at least one host cluster, at least one director cluster and at least one storage array.

13. The non-transitory computer-readable medium according to claim 8, wherein the second site is located remotely from the first site across an asynchronous distance.

14. The non-transitory computer-readable medium according to claim 8, further comprising:
executable code that combines data from a cache at the first site with data being written by the application at the first site in response to writing application data when the cache at the first site contains data awaiting transfer to the second site and the data from the cache corresponds to the application data.

15. An active/active system, comprising:
a first site;
a second site located remotely from the first site, wherein each of the first site and the second site include at least one host cluster, at least one director cluster, and at least one storage array; and
a computer readable medium of at least one of: the host cluster or the director cluster that stores software for providing mobility of an application between the first site and the second site, the software including:
executable code that controls transitioning into a semi-synchronous mode by grouping writes by the application into delta sets to provide write order consistency, a first delta set being closed to finish pending writes by the application thereto and a second, different, delta set being opened and accepting new writes from the application after closing the first delta set and after a last one of the writes completes to the first delta set;
executable code that propogates writes by the application at the first site to the second site and wherein, during the transitioning into the semi-synchronous mode, data written by the application at the first site to the first delta set is subsequently transferred to the second site while the first site is accepting the writes by the application to the second delta set;
executable code that synchronizes cache data for the application between the first site and the second site by copying modified data from the first site to the second site, wherein the modified data is separate from data provided in the delta sets and wherein propagating writes by the application at the first site to the second site results in the cache data remaining unchanged;
executable code that suspends operation of the application on the first site following completion of synchronizing cache data; and
executable code that resumes operation of the application on the second site.

16. The active/active system according to claim 15, wherein the application is a virtual machine.

17. The active/active system according to claim 16, wherein the virtual machine is transferred from the first site to the second site by transferring an image of the virtual machine from the first site to the second site.

18. The active/active system according to claim 15, wherein the second site is selected by a user.

19. The active/active system according to claim 15, wherein the second site is located remotely from the first site across an asynchronous distance.

20. The active/active system according to claim 15, wherein the software further includes executable code that combines data from a cache at the first site with data being written by the application at the first site in response to writing application data when the cache at the first site contains data awaiting transfer to the second site and the data from the cache corresponds to the application data.

* * * * *